United States Patent
Park et al.

(10) Patent No.: US 10,536,960 B2
(45) Date of Patent: Jan. 14, 2020

(54) METHOD AND DEVICE FOR TRANSMITTING AND RECEIVING UPLINK SIGNAL BETWEEN USER EQUIPMENT AND BASE STATION IN WIRELESS COMMUNICATION

(71) Applicant: LG ELECTRONICS INC., Seoul (KR)

(72) Inventors: Hanjun Park, Seoul (KR); Suckchel Yang, Seoul (KR); Seonwook Kim, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,765

(22) PCT Filed: Jan. 8, 2018

(86) PCT No.: PCT/KR2018/000331
§ 371 (c)(1),
(2) Date: Jun. 22, 2018

(87) PCT Pub. No.: WO2018/128493
PCT Pub. Date: Jul. 12, 2018

(65) Prior Publication Data
US 2019/0230685 A1      Jul. 25, 2019

Related U.S. Application Data

(60) Provisional application No. 62/443,792, filed on Jan. 8, 2017, provisional application No. 62/458,960, filed (Continued)

(51) Int. Cl.
*H04W 72/12* (2009.01)
*H04W 72/04* (2009.01)
*H04L 5/00* (2006.01)

(52) U.S. Cl.
CPC .......... *H04W 72/1263* (2013.01); *H04L 5/00* (2013.01); *H04W 72/0406* (2013.01);
(Continued)

(58) Field of Classification Search
CPC ......... H04W 72/1263; H04W 72/0406; H04W 72/0446; H04W 72/0453; H04W 72/12; H04W 72/1289; H04L 5/00
See application file for complete search history.

(56) References Cited

U.S. PATENT DOCUMENTS 9,001,798 B2    4/2015   Papasakellariou et al.
9,374,806 B2    6/2016   Han et al.
(Continued)

FOREIGN PATENT DOCUMENTS

KR        1020150102029          9/2015

OTHER PUBLICATIONS

Huawei, "Remaining issues on shortened processing time for 1ms TTI," 3GPP TSG RAN WG1 Meeting #87, Nov. 14-18, 2016.
(Continued)

*Primary Examiner* — Duc C Ho
(74) *Attorney, Agent, or Firm* — Fish & Richardson P.C.

(57) ABSTRACT

The present invention provides a method for transmitting or receiving an uplink signal between a terminal and a base station in a wireless communication system, and a device supporting the same. More particularly, the present invention provides: a configuration wherein when various numerologies are applied, a terminal receives downlink data from a base station and transmits uplink control information corresponding to the received downlink data; and a corresponding operation configuration of the base station.

12 Claims, 13 Drawing Sheets

Related U.S. Application Data on Feb. 14, 2017, provisional application No. 62/475,841, filed on Mar. 23, 2017, provisional application No. 62/480,443, filed on Apr. 2, 2017, provisional application No. 62/480,549, filed on Apr. 3, 2017, provisional application No. 62/481,608, filed on Apr. 4, 2017, provisional application No. 62/501,063, filed on May 3, 2017, provisional application No. 62/566,342, filed on Sep. 30, 2017, provisional application No. 62/592,379, filed on Nov. 29, 2017, provisional application No. 62/595,597, filed on Dec. 7, 2017.

(52) U.S. Cl.
CPC ... *H04W 72/0446* (2013.01); *H04W 72/0453* (2013.01); *H04W 72/12* (2013.01); *H04W 72/1289* (2013.01)

(56) References Cited

U.S. PATENT DOCUMENTS

| | | | |
|---|---|---|---|
| 9,380,568 B2 | 6/2016 | Harrison et al. | |
| 2011/0110246 A1* | 5/2011 | Damnjanovic | H04L 1/0028 370/252 |
| 2014/0016519 A1* | 1/2014 | Kim | H04W 72/1263 370/280 |
| 2015/0229454 A1* | 8/2015 | Takeda | H04W 72/042 370/329 |
| 2015/0257150 A1* | 9/2015 | Yi | H04B 7/26 370/329 |
| 2016/0007374 A1* | 1/2016 | Lee | H04J 11/00 370/336 |
| 2016/0286558 A1 | 9/2016 | Chae et al. | |

OTHER PUBLICATIONS

Samsung, "Discussions on periodic CSI reporting for class A in eFD-MIMO," 3GPP TSG RAN WG1 Meeting #84bis, Apr. 11-15, 2016.

Intel Corporation, "On reducing processing time for 1ms TTI," 3GPP TSG-RAN WG1 #86, Aug. 22-26, 2016.

NTT DOCOMO, Inc., "UE reporting for sidelink SPS operation," 3GPP TSG RAN WG1 Meeting #85, May 23-27, 2016.

CMCC, "Discussion on DCI contents for NR PDCCH," 3GPP TSG RAN WG1 Meeting #87, Nov. 14-18, 2016.

ZTE, "NR Downlink DCI Design and Procedure," 3GPP TSG RAN WG1 Meeting #87, Nov. 14-18, 2016.

PCT International Search Report in Application No. PCT/KR2018/000331 dated Apr. 10, 2018, 11 pages.

Intel Corporation, "On reducing processing time for 1ms TTI," R1-1611944, 3GPP TSG-RAN WG1 #87, Reno, USA, Nov. 14-18, 2016, 3 pages.

Intel Corporation, "Resource allocation for NR uplink control channel," R1-1611997, 3GPP TSG-RAN WG1 #87, Reno, USA, Nov. 14-18, 2016, 4 pages.

Ericsson, "Summary of e-mail discussions on uplink control signaling," R1-1612916, TSG-RAN WG1 #87, Reno, NV, Nov. 14-18, 2016, 22 pages.

LG Electronics, "Consideration on Un Uplink Channel Design," R1-106142, 3GPP TSG RAN WG1 Meeting #63, Jacksonville, USA, Nov. 15-19, 2010, 3 pages.

LG Electronics, "Discussion on Control Signaling for Uplink Transmission Mode," R1-105661, 3GPP TSG RAN WG1 Meeting #62bis, Xi-an, China, Oct. 11-15, 2010, 4 pages.

* cited by examiner

FIG. 15
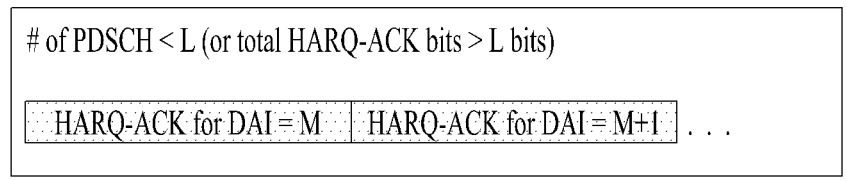
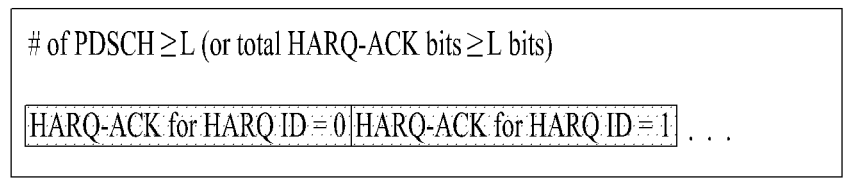
FIG. 16
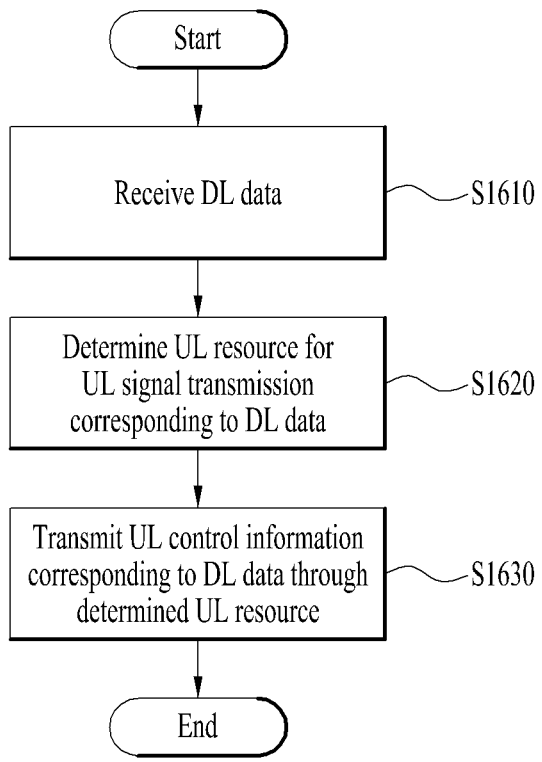

METHOD AND DEVICE FOR TRANSMITTING AND RECEIVING UPLINK SIGNAL BETWEEN USER EQUIPMENT AND BASE STATION IN WIRELESS COMMUNICATION

CROSS-REFERENCE TO RELATED APPLICATIONS

This application is a National Stage application under 35 U.S.C. § 371 of International Application No. PCT/KR2018/000331, filed on Jan. 8, 2018, which claims the benefit of U.S. Provisional Application No. 62/595,597, filed on Dec. 7, 2017, U.S. Provisional Application No. 62/592,379, filed on Nov. 29, 2017, U.S. Provisional Application No. 62/566,342, filed on Sep. 30, 2017, U.S. Provisional Application No. 62/501,063, filed on May 3, 2017, U.S. Provisional Application No. 62/481,608, filed on Apr. 4, 2017, U.S. Provisional Application No. 62/480,549, filed on Apr. 3, 2017, U.S. Provisional Application No. 62/480,443, filed on Apr. 2, 2017, U.S. Provisional Application No. 62/475,841, filed on Mar. 23, 2017, U.S. Provisional Application No. 62/458,960, filed on Feb. 14, 2017, and U.S. Provisional Application No. 62/443,792, filed on Jan. 8, 2017. The disclosures of the prior applications are incorporated by reference in their entirety.

TECHNICAL FIELD

The following description relates to a wireless communication system, and more particularly, to a method for transmitting and receiving an uplink signal between a terminal and a base station in a wireless communication system to which various numerologies are applicable, and a device supporting the same.

More specifically, the following description includes description of a method for receiving downlink data from a base station and transmitting uplink control information corresponding to the received downlink data by a terminal when various numerologies are applied, and a corresponding operation of a base station.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention devised to solve the problem lies in a method for transmitting and receiving an uplink signal between a terminal and a base station in a newly proposed communication system.

In particular, it is an object of the present invention to provide a configuration in which a terminal receives one or more downlink data from a base station and transmits uplink control information in response when signals are transmitted and received by applying various numerologies in a newly proposed communication system, and a configuration of a base station corresponding thereto.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method and devices for transmitting and receiving uplink control information between a terminal and a base station in a wireless communication system.

In one aspect of the present invention, provided herein a method for transmitting an uplink signal to a base station by a terminal in a wireless communication system, the method including receiving downlink control information (DCI) for scheduling one or more downlink data and receiving the one or more downlink data based on the DCI, determining an uplink resource for uplink signal transmission corresponding to the one or more downlink data, the uplink resource being one uplink candidate resource among a plurality of uplink candidate resources configured by higher layer signaling or system information based on indication information included in the DCI and information about the DCI, and transmitting uplink control information corresponding to the one or more downlink data through the determined uplink resource.

In another aspect of the present invention, provided herein is a method for receiving an uplink signal from a terminal by a base station in a wireless communication system, the method including transmitting downlink control information (DCI) for scheduling one or more downlink data to the terminal and transmitting the one or more downlink data based on the DCI, and receiving uplink control information corresponding to the one or more downlink data through a specific uplink resource, wherein the specific uplink resource is configured as one uplink candidate resource among a plurality of uplink candidate resources configured by higher layer signaling or system information based on indication information included in the DCI and information about the DCI.

In another aspect of the present invention, provided herein is a terminal for transmitting an uplink signal to a base station in a wireless communication system, the terminal including a transmission unit, a reception unit, and a processor connected to the transmission unit and the reception unit, wherein the processor is configured to receive downlink control information (DCI) for scheduling one or more downlink data and receive the one or more downlink data based on the DCI, to determine an uplink resource for uplink signal transmission corresponding to the one or more downlink data, the uplink resource being one uplink candidate resource among a plurality of uplink candidate resources configured by higher layer signaling or system information based on indication information included in the DCI and information about the DCI, and to transmit uplink control information corresponding to the one or more downlink data through the determined uplink resource.

In another aspect of the present invention, provided herein is a base station for receiving an uplink signal from a terminal in a wireless communication system, the base station including a transmission unit, a reception unit, and a processor connected to the transmission unit and the reception unit, wherein the processor is configured to transmit downlink control information (DCI) for scheduling one or more downlink data to the terminal and transmit the one or more downlink data based on the DCI and to receive uplink control information corresponding to the one or more downlink data through a specific uplink resource, wherein the specific uplink resource is configured as one uplink candidate resource among a plurality of uplink candidate resources configured by higher layer signaling or system information based on indication information included in the DCI and information about the DCI.

In the configuration above, the indication information may be configured to have a size of 2 bits, wherein the system information may be a system information block (SIB) or a remaining minimum system information (RMSI).

In addition, the plurality of uplink candidate resources may include more than four uplink candidate resources.

Herein, the plurality of uplink candidate resources may be divided into a plurality of uplink candidate resource groups each including two or more first uplink candidate resources, wherein the indication information may indicate one uplink candidate resource group among the plurality of uplink candidate resource groups, wherein the one uplink candidate resource may be determined based on the information about the DCI among two or more uplink candidate resources included in the one uplink candidate resource group indicated by the indication information.

In the configuration above, the information about the DCI includes one or more of (1) an index of a starting control channel element (CCE) in which the DCI has been transmitted, (2) an index of a PDCCH candidate in which the DCI has been transmitted, (3) an index of a downlink control region in which the DCI has been transmitted, (4) an index of a starting physical resource block (PRB) of the one or more downlink data indicated by the DCI, (5) Hybrid Automatic Repeat Request (HARQ) ACK timing indicated by the DCI, and (6) a bandwidth part (BWP) index indicated by the DCI.

In addition, a size of the determined uplink resource may be set differently depending on the number of the one or more downlink data.

In addition, the uplink control information may include acknowledgment information about the one or more downlink data.

In addition, the downlink data may correspond to a physical downlink shared channel (PDSCH), and the uplink resource may correspond to a physical uplink control channel (PUCCH).

In addition, the plurality of uplink candidate resources may be configured for each bandwidth part (BWP).

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a terminal may transmit uplink control information to a base station using uplink resources determined using a different method according to a situation.

In particular, an NR system to which the present invention is applicable supports a PUCCH (hereinafter referred to as a short PUCCH) transmitted through one or two symbols and a PUCCH (hereinafter referred to as a long PUCCH) transmitted through four or more symbols, and therefore needs various PUCCH resources compared to the legacy LTE system. In this regard, the terminal according to the present invention may determine a specific PUCCH resource without increasing signaling overhead compared to the legacy LTE system.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 15 is a diagram schematically illustrating a configuration for changing an aggregated HARQ-ACK configuration scheme depending on the number of polling target PDSCHs or the sum of polling target HARQ-ACK bits according to the present invention;

FIG. 16 is a flowchart illustrating a method for transmitting an uplink signal of a terminal according to the present invention.

BEST MODE

Figure 1:
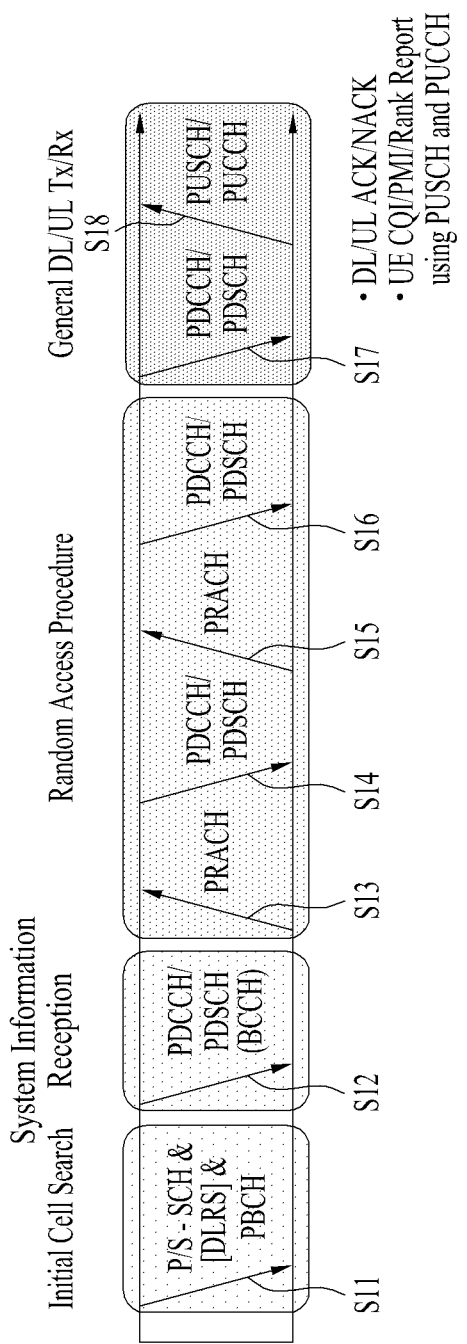
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure. Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
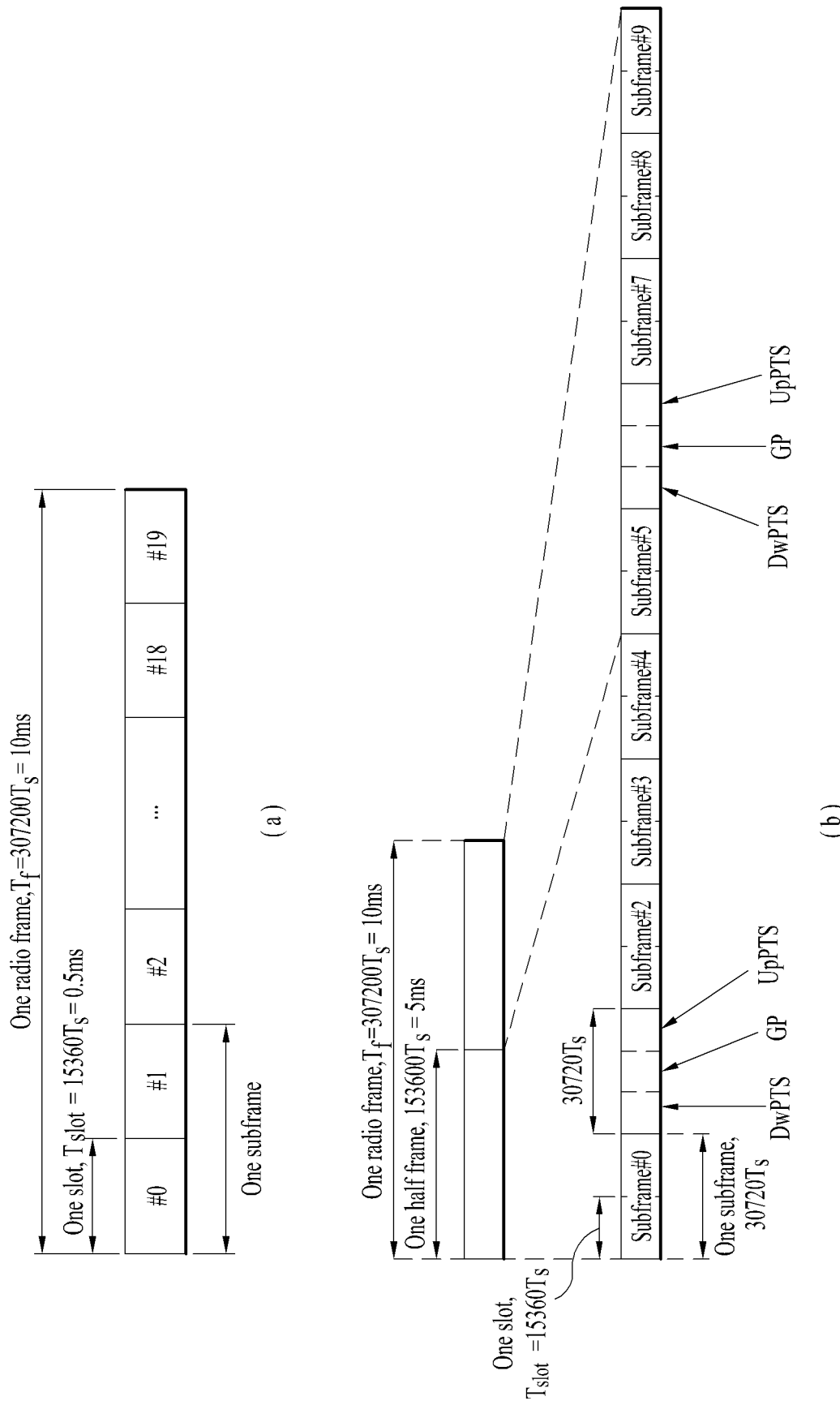
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
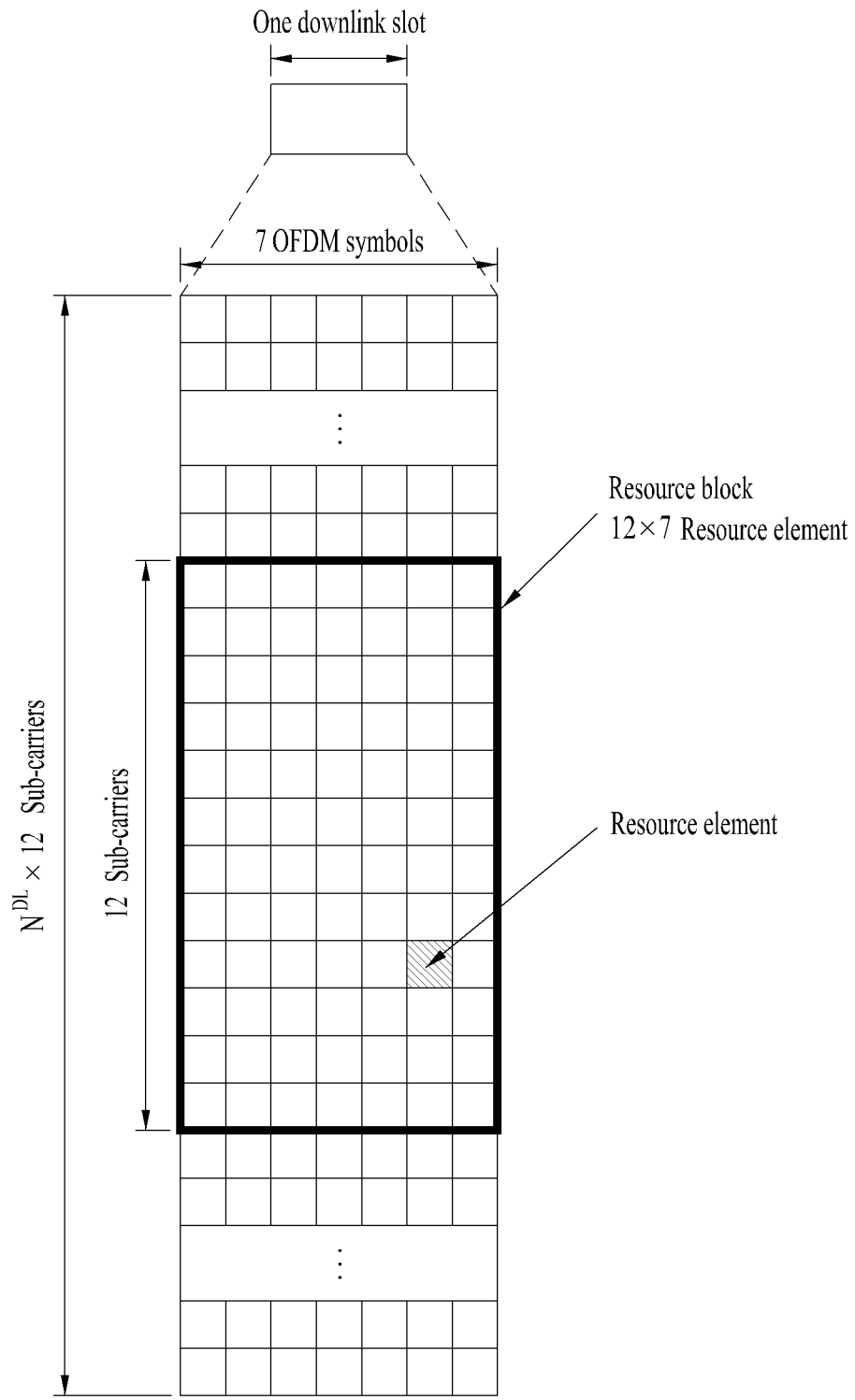
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
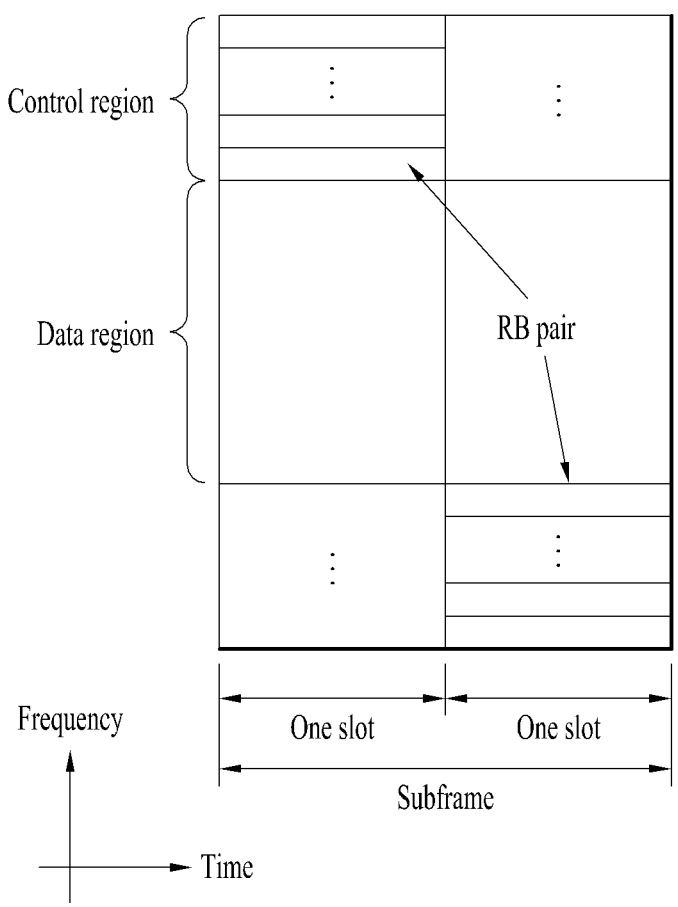
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
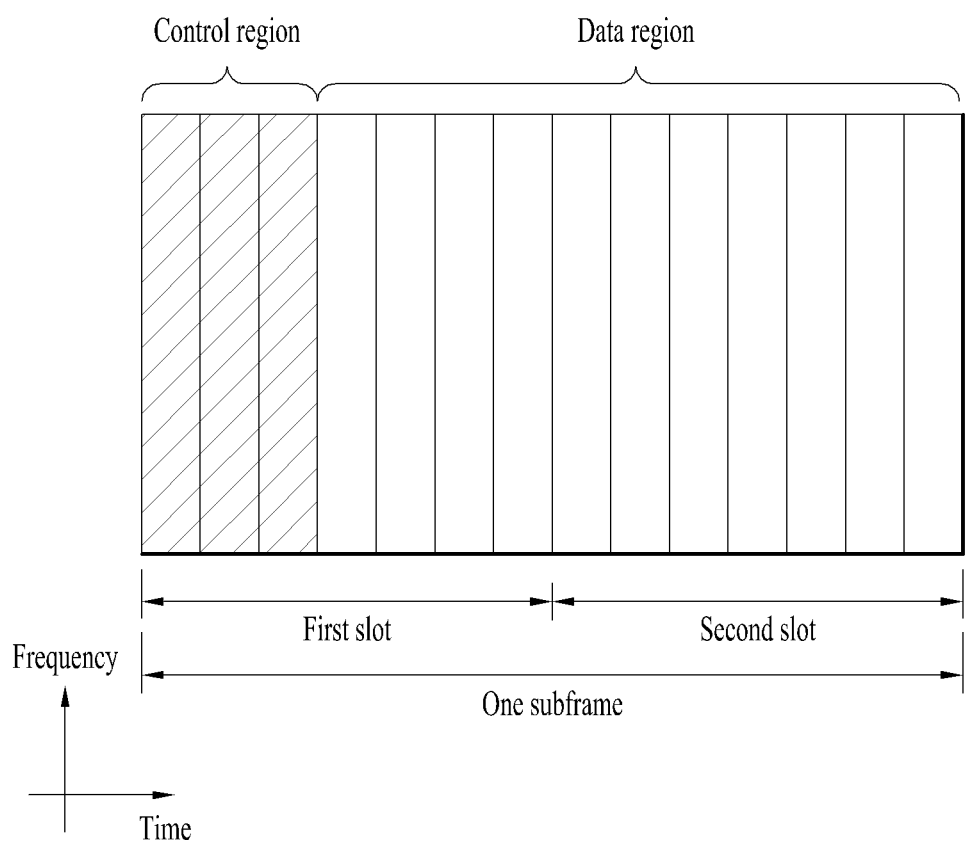
FIG. 5 is a diagram illustrating an exemplary structure of a downlink subframe.
Figure 6:
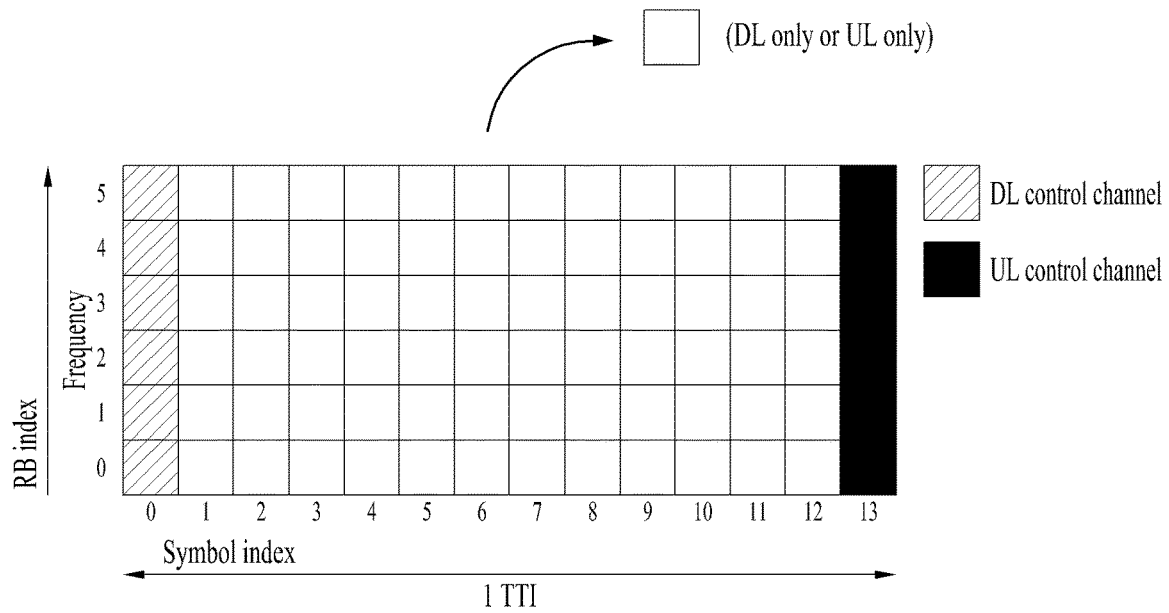
FIG. 6 is a diagram illustrating a self-contained subframe structure applicable to the present invention.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

LTE systems support radio resource management (RRM) operations including power control, scheduling, cell search, cell reselection, handover, radio link or connection monitoring, and connection establishment/re-establishment. In this operation, a serving cell may make a request to a UE for RRM measurement information, which is a measurement value for performing the RRM operation. As typical information, in an LTE system, a UE may measure information such as cell search information on each cell, reference signal received power (RSRP), and reference signal received quality (RSRQ) and report the same as typical information. Specifically, in the LTE system, the UE may receive 'measConfig' from the serving cell over a higher-layer signal for RRM measurement, and measure the RSRP or RSRQ according to the information of 'measConfig'.

Here, RSRP, RSRQ, and RSSI disclosed in the LTE system may be defined as follows.

First, reference signal received power (RSRP) is defined as the linear average over the power contributions (in [W]) of the resource elements that carry cell-specific reference signals within the considered measurement frequency bandwidth. For example, for RSRP determination the cell-specific reference signals $R_0$ shall be used. If the UE can reliably detect that $R_1$ is available it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

Next, Received Signal Strength Indicator (RSSI) is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the definitions above, in the case of intra-frequency measurement, a UE operating in the LTE system may measure RSRP in the bandwidth indicated through the allowed measurement bandwidth-related information element (IE), which is transmitted on system information block type 3, in SIB3. Alternatively, in the case of inter-frequency measurement, the UE may measure RSRP in a bandwidth corresponding to one of 6, 15, 25, 50, 75, and 100 resource blocks (RBs) indicated through the allowed measurement bandwidth transmitted in SIB5. Alternatively, in the case where the IE is absent, the UE may measure RSRP in the frequency band of the entire downlink (DL) system as a default operation.

In this case, if the UE receives the information on the allowed measurement bandwidth, the UE may consider the corresponding value as the maximum measurement bandwidth and freely measure the RSRP value within the range of the corresponding value. However, if the serving cell transmits an IE defined as WB-RSRQ to the UE and the allowed measurement bandwidth is set to 50 RBs or more, the UE shall calculate the RSRP value for the entire allowed measurement bandwidth. In the RSSI measurement, the UE measures RSSI using the frequency band of the receiver of the UE according to the definition of the RSSI bandwidth.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-contained Subframe Structure

Figure 11:
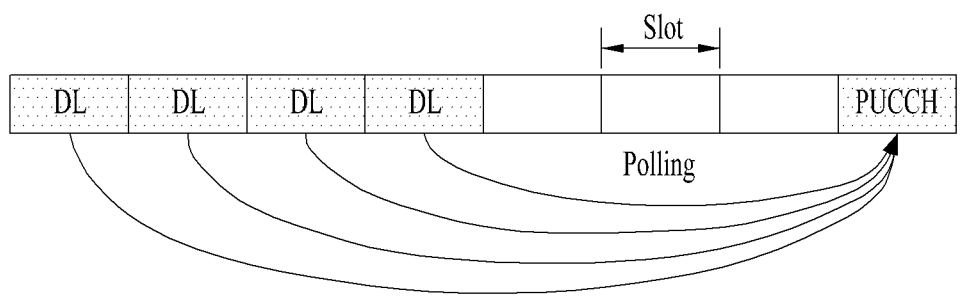
FIG. 11 is a diagram schematically illustrating an operation in which a plurality of HARQ-ACKs for a plurality of DL slots is transmitted through a single PUCCH resource.

FIG. 11 is a diagram illustrating a self-contained subframe structure applicable to the present invention.

In the NR system to which the present invention is applicable, a self-contained subframe structure as shown in FIG. 11 is proposed in order to minimize data transmission latency in the TDD system.

In FIG. 11, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 11.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
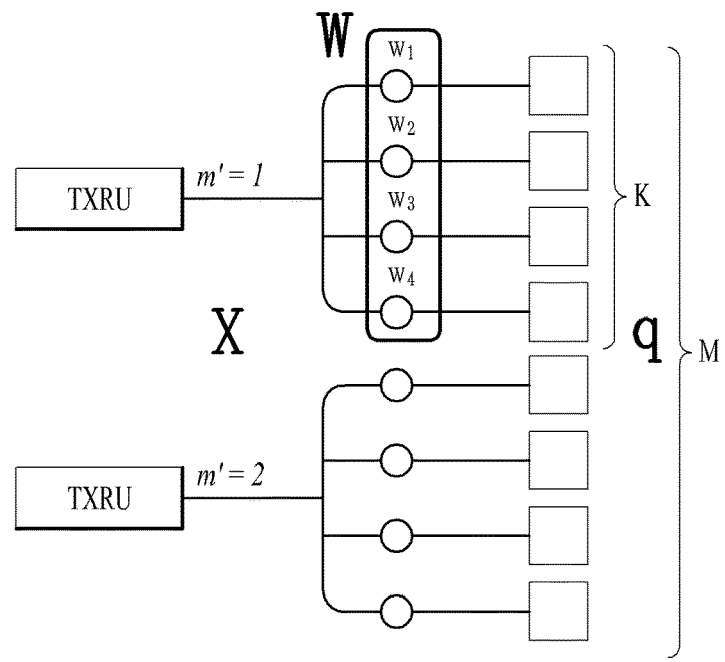
FIGS. 7 and 8 are diagrams illustrating representative methods for connecting TXRUs to antenna elements.
Figure 8:
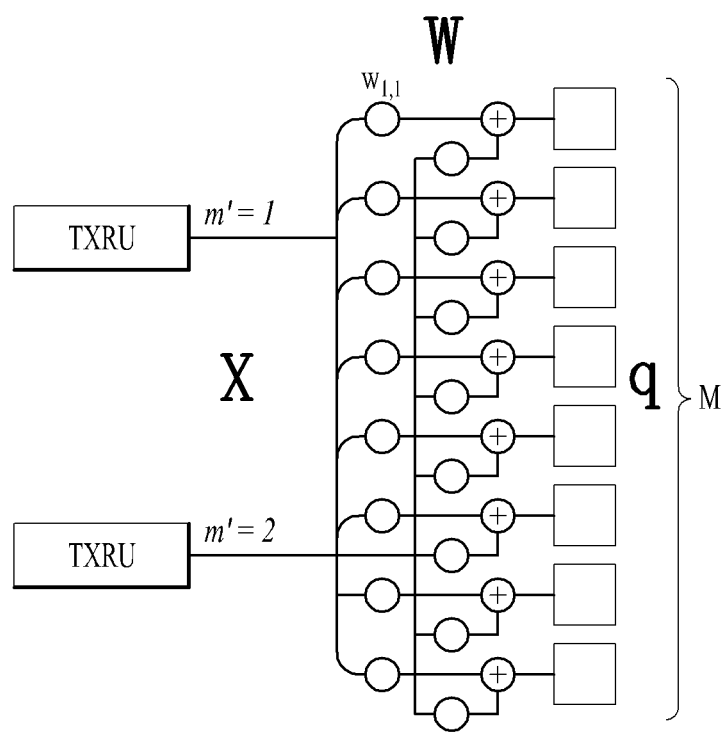

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas is used in an NR system to which the present invention is applicable, a hybrid beamforming technique combining digital beamforming and analog beamforming may be employed. Herein, analog beamforming (or Radio Frequency (RF) beamforming) refers to an operation of precoding (or combining) at the RF stage. In hybrid beamforming, the baseband stage and the RF stage perform precoding (or combining), respectively. Therefore, the number of RF chains and the number of digital-to-analog (D/A) (or analog-to-digital (A/D)) converters may be reduced, while achieving performance close to digital beamforming.

For simplicity of explanation, the hybrid beamforming structure may be represented by N transceiver units (TXRUs) and M physical antennas. In this case, digital beamforming for L data layers to be transmitted by the transmission end may be represented by an N*(N by L) matrix. The N converted digital signals obtained thereafter may be converted into analog signals via the TXRUs, and analog beamforming represented by an M*N (M by N) matrix is applied to the converted signals.

Figure 9:
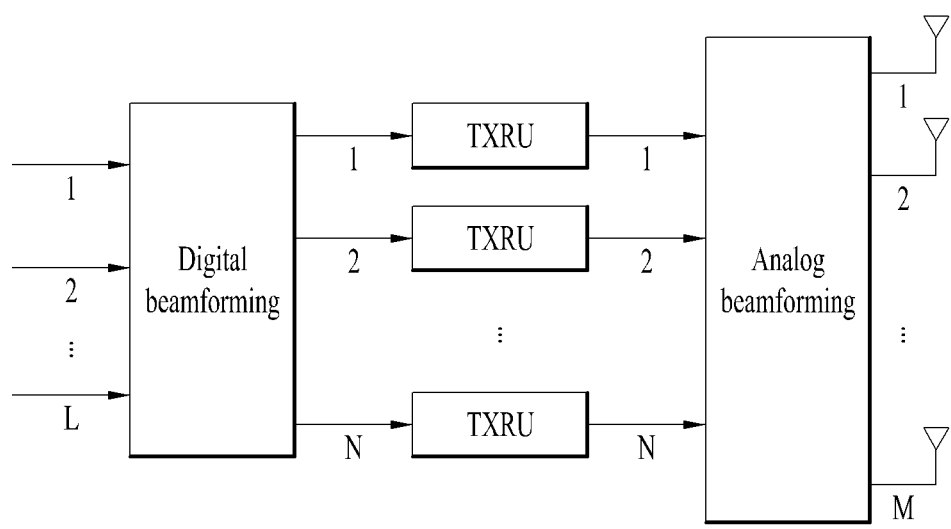
FIG. 9 is a diagram schematically illustrating a hybrid beamforming structure from the perspective of a TXRU and a physical antenna according to an embodiment of the present invention.

FIG. 9 is a diagram schematically illustrating a hybrid beamforming structure from the perspective of a TXRU and a physical antenna according to an embodiment of the present invention. In FIG. 9, the number of digital beams is L, and the number of analog beams is N.

Additionally, in the NR system to which the present invention is applicable, a method for supporting more efficient beamforming for a UE located in a specific area by designing the base station so as to change the analog beamforming on a symbol-by-symbol basis is being considered. Further, as shown in FIG. 9, when N specific TXRUs and M RF antennas are defined as one antenna panel, a plurality of antenna panels to which independent hybrid beamforming is applicable may be employed in the NR system according to the present invention.

When the base station utilizes a plurality of analog beams as described above, analog beams advantageous for signal reception may differ from UE to UE. Accordingly, in the NR system to which the present invention is applicable, a beam sweeping operation in which the base station transmits signals (at least a synchronization signal, system information, paging, and the like) by applying different analog beams on respective symbols in a specific subframe (SF) to allow all UEs to have a reception opportunity is being considered.

Figure 10:
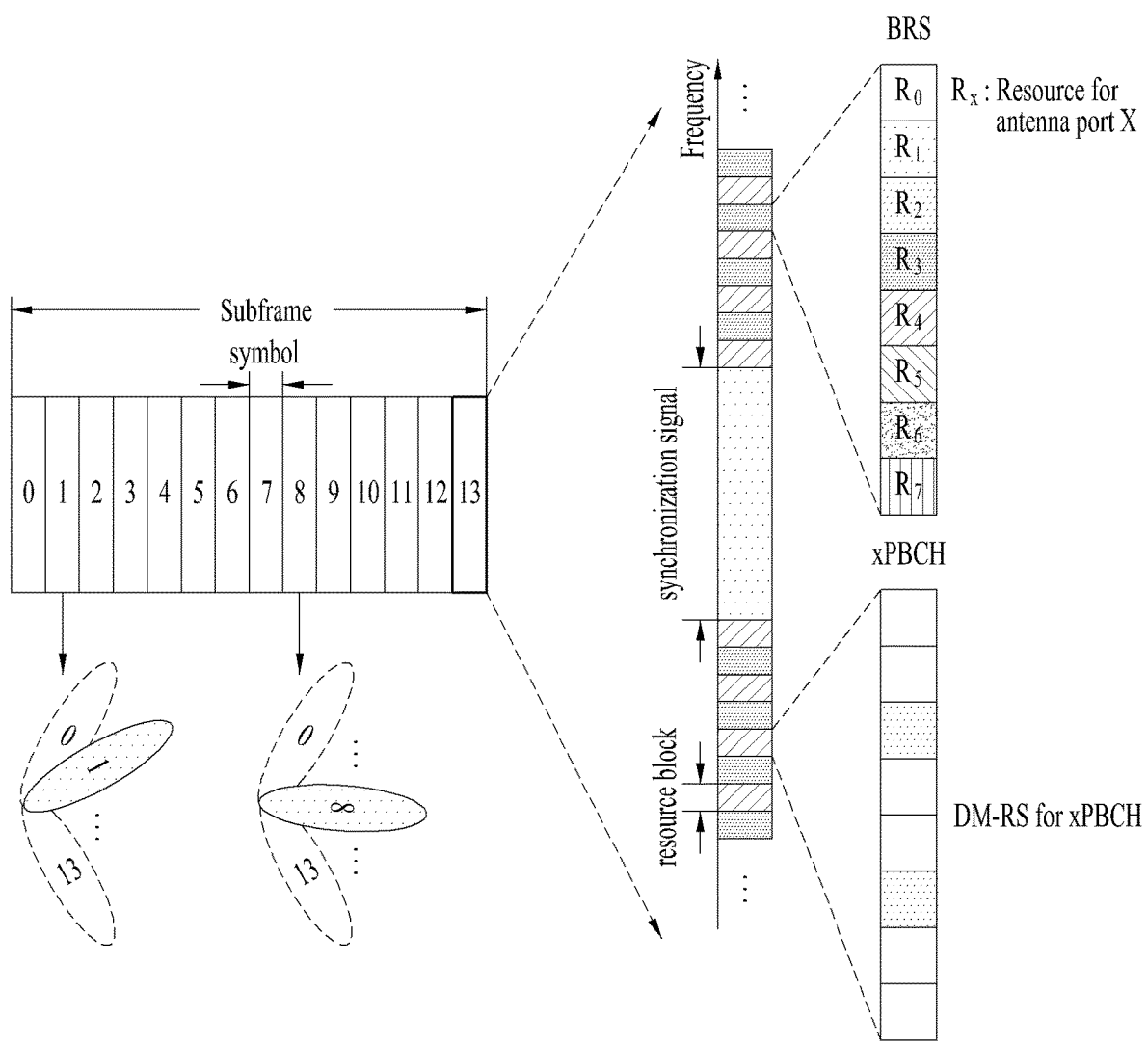
FIG. 10 is a diagram schematically illustrating a beam sweeping operation for a synchronization signal and system information in a downlink (DL) transmission process according to an embodiment of the present invention.

FIG. 10 is a diagram schematically illustrating a beam sweeping operation for a synchronization signal and system information in a downlink (DL) transmission process according to an embodiment of the present invention.

In FIG. 10, a physical resource (or a physical channel) on which system information of the NR system to which to the present invention is applicable is transmitted in a broadcasting manner is referred to as an xPBCH (physical broadcast channel). Here, analog beams belonging to different antenna panels within one symbol may be simultaneously transmitted.

In addition, as shown in FIG. 10, in the NR system to which the present invention is applicable, introduction of a beam reference signal (BRS), which is a reference signal (RS) transmitted by applying a single analog beam (corresponding to a specific antenna panel), is being discussed as an element for measuring a channel for each analog beam. The BRS may be defined for a plurality of antenna ports, and each antenna port of the BRS may correspond to a single analog beam. At this time, unlike the BRS, the synchronization signal or the xPBCH may be transmitted by applying all the analog beams in an analog beam group such it is well received by any UE.

3. Proposed Embodiments

Hereinafter, a detailed description will be given of a method for transmitting, by a UE, hybrid automatic repeat request-acknowledgement (HARQ-ACK) information for one or more DL data transmissions when any slot (or subframe) is dynamically configurable for use on downlink (DL) or uplink (UL) in a wireless communication system composed of a base station and the UE, based on the technical configurations described above.

More specifically, in this specification, a method for allocating a PUCCH resource for transmission of the HARQ-ACK information will be described, and additionally a method for transmitting the HARQ-ACK information in a case where the HARQ-ACK information includes HARQ-ACKs for a plurality of DL data transmissions will be described in detail.

In the NR system to which the present invention is applicable, a network slicing technique for implementing a plurality of logical networks on a single physical network may be supported. To this end, the logical networks must be capable of supporting services having various requirements (e.g., enhanced Mobile Broadband (eMBB), massive Machine Type Communication (mMTC), Ultra Reliable Low Latency Communication (URLLC), etc.). In addition, the physical layer system of the NR system to which the present invention is applicable must be capable of supporting an orthogonal frequency division multiplexing (OFDM) scheme in which a variable numerology is applicable according to the various services. In other words, in the NR system to which the present invention is applicable, an OFDM scheme (or a multiple access scheme) in which independent numerologies are applied in each time and frequency resource region may be supported.

In the NR system to which the present invention is applicable, flexibility is considered as an important design philosophy in order to support the various services described above. Therefore, when a scheduling unit in the NR system to which the present invention is applicable is called a slot, the NR system may support a structure (hereinafter referred to as dynamic DL/UL configuration) which allows any slot to be dynamically switched to a PDSCH (or physical channel for transmission of DL data) transmission slot (hereinafter referred to as a DL slot) or to a PUSCH (or physical channel for transmission of UL data) transmission slot (hereinafter referred to as a UL slot).

In particular, when the dynamic DL/UL configuration is supported in an NR system to which the present invention is applicable, HARQ-ACK for several DL slots may be transmitted through one PUCCH resource if an excessively high latency is not required for HARQ-ACK transmission.

FIG. 11 is a diagram schematically illustrating an operation in which a plurality of HARQ-ACKs for a plurality of DL slots is transmitted through a single PUCCH resource.

As shown in FIG. 11, in the NR system according to the present invention, HARQ-ACKs for each DL slot are not transmitted in each determined PUCCH resource. Instead, an operation of combining the HARQ-ACKs for multiple DL slots (for example, HARQ-ACK aggregation) and transmitting the same through one PUCCH resource (or transmitting UL control information such as HARQ-ACKs and/or channel state information (CSI) on a physical channel) may be supported. This operation may reduce the UL control overhead.

In this specification, a method for allocating a PUCCH resource for transmission of HARQ-ACKs for one or more DL slots will be described, and additionally a method for aggregating, when the one or more DL slots are composed of a plurality of DL slots, HARQ-ACKs for the DL slots and transmitting the same through a single PUCCH resource will be described in detail.

For simplicity of explanation, in this specification, an operation of aggregating HARQ-ACKs for a specific plurality of PDSCHs and instructing the same to be transmitted through a specific single PUCCH resource (or a UL control information (UCI) transmission region in the specific single PUSCH resource) is referred to as a polling-based HARQ-ACK feedback operation, and the downlink control information (DCI) instructing this operation is referred to as polling DCI. In the following description, DL assignment refers to DCI indicating scheduling of a PDSCH, and UL grant refers to DCI indicating scheduling of a PUSCH.

In the present invention, the downlink assignment index (DAI) may be a value included in the DL assignment and indicating the scheduling order of the PDSCH. When the bit field for DAI has k bits, the DAI value may be one of 0, 1, . . . , $L(=2^k)-1$, and one DAI value may mean a plurality of scheduling positions in order.

For example, when P=1, M-th scheduling positions in order are possible, the scheduling position P in order may be represented by the DAI value of (P−1)mod L.

Table 4 below shows an example where L=4 and M=8. For example, the fifth scheduling position in order may be represented by a DAI value of (5−1)mod 4=0. Here, ambiguity of the scheduling position in order may not occur unless the UE misses (L−1) DAI values in series. Therefore, the UE may operate a counter for the PDSCH scheduling order based on the DAI value.

TABLE 4

| DAI | Scheduling order |
|---|---|
| 0 | 1, 5 |
| 1 | 2, 6 |
| 2 | 3, 7 |
| 3 | 4, 8 |

Hereinafter, a method for allocating a PUCCH resource through which HARQ-ACKs for one or more DL slots are transmitted will be described in detail.

3.1. PUCCH Resource Allocation Method 3.1.1. First PUCCH Resource Allocation Method When a base station allocates a HARQ-ACK resource (or a PUCCH resource) for PDSCH(s) scheduled using a specific DL assignment, the base station may allocate a HARQ-ACK resource (or a PUCCH resource) for HARQ-ACK transmission for the specific PDSCH(s) or a UL control region in an implicit manner based on one or more of the following variables:

(1) a (starting) control channel element (CCE) index in which the DL assignment is transmitted;

(2) a DL control region index in which the DL assignment is transmitted;

(3) a (starting) physical resource block (PRB) index of a PDSCH region indicated by the DL assignment; and (4) HARQ-ACK timing indicated by the DL assignment.

Here, the DL control region (or UL control region) refers to a region of time and frequency resources in which a PDCCH (or PUCCH) may be transmitted.

Also, the HARQ-ACK timing may be a value (T1+T2) combining the PDSCH transmission time T1 with respect to the reception time of the DL assignment and the HARQ-ACK transmission time T2 with respect to the PDSCH transmission time.

More specifically, in the NR system to which the present invention is applicable, there may be a plurality of HARQ-ACK transmission times for a specific PDSCH, and a plurality of PDSCHs which are assigned the same CCE index but have different HARQ-ACK timings in the UL control region may coexist. In this case, if a PUCCH resource is allocated based on the CCE index, collision may occur between the plurality of PDSCHs for the PUCCH resource.

Accordingly, the present invention proposes that HARQ-ACK timing be considered as an additional variable in allocating a PUCCH resource in an implicit manner. For example, the base station may allocate a PUCCH resource (or UL control region) according to a combination of a starting CCE index of the DL assignment and HARQ timing, a combination of a starting PDB index of a PDSCH region and HARQ timing, or a combination of a DL control region index of the DL assignment and HARQ timing.

The first PUCCH resource allocation method may be applied in combination with other proposals of the present invention as long as they do not conflict with each other.

3.1.2. Second PUCCH Resource Allocation Method

When a base station allocates a HARQ-ACK resource (or a PUCCH resource) for PDSCH(s) scheduled using a specific DL assignment, the base station may dynamically indicate one of a plurality of UL control regions (or HARQ-ACK resource groups or PUCCH resource groups) through DCI (e.g., DL assignment), and may allocate a HARQ-ACK resource (a PUCCH resource) in an implicit manner based on one or more of the following variables in a corresponding UL control region:

(1) a (starting) control channel element (CCE) index in which the DL assignment is transmitted;

(2) a DL control region index in which the DL assignment is transmitted;

(3) a (starting) PRB index of a PDSCH region indicated by the DL assignment; and (4) HARQ-ACK timing indicated by the DL assignment.

Here, the DL control region (or UL control region) refers to a region of time and frequency resources in which a PDCCH (or PUCCH) may be transmitted.

Also, the HARQ-ACK timing may be a value (T1+T2) combining the PDSCH transmission time T1 with respect to the reception time of the DL assignment and the HARQ-ACK transmission time T2 with respect to the PDSCH transmission time.

In addition, the base station may configure a specific state of a specific bit field (hereinafter referred to as an ACK/NACK resource indicator (ARI)) in the DCI so as to indicate the UL control region (or HARQ-ACK resource group or PUCCH resource group) or to indicate a specific single PUCCH resource (through a higher layer signal or the like). In particular, in the latter case, the base station may directly inform the UE of a PUCCH resource through the specific state of the ARI. In other words, the base station may configure each state of the ARI in the DCI for the UE so as to correspond to a PUCCH resource group composed of a plurality of PUCCH resources (e.g., the base station indicates a PUCCH resource group to be used among the PUCCH resource groups using the ARI, and determines a PUCCH resource to be actually used by the UE in an implicit manner) or to correspond to a single PUCCH resource (e.g., the UE uses the PUCCH resource indicated by the base station using the ARI).

More specifically, in the present invention, a base station may utilize both an explicit indication and an implicit indication as a method for allocating a HARQ-ACK resource (or a PUCCH resource).

For example, the base station may pre-configure a plurality of UL control regions for the UE through a higher layer signal or system information, and indicate one of the plurality of configured UL control regions through DCI (e.g., DL assignment) as a HARQ-ACK resource for a specific PDSCH. In response, the HARQ-ACK resource (or PUCCH resource) in the UL control region in which the UE actually transmits a HARQ-ACK may be determined based on a function taking one or more of a (starting) CCE index in which the DL assignment is transmitted, a DL control region index, a (starting) PRB index, a region to which the PDSCH is allocated and HARQ timing as a variable.

In the following description, a counter downlink assignment index (DAI) (hereinafter referred to as a c-DAI) indicates a specific index value in DCI (e.g., DL scheduling DCI) indicating an order of (scheduled) PDSCHs (or transport blocks (TBs) or code block groups (CBGs)), and a total DAI (hereinafter referred to as t-DAI) indicates a specific index value in DCI (e.g., DL scheduling DCI) indicating the total number of PDSCHs (or TBs or CBGs) subjected to HARQ-ACK reporting. When the UE configures a HARQ-ACK payload, input bits may be configured according to the c-DAI order. For simplicity of explanation, the DAI mentioned in the following description may mean the c-DAI.

The base station may configure a PUCCH resource set (for HARQ-ACK transmission) and indicate a subset in the PUCCH resource set (for HARQ-ACK transmission) through DCI (e.g., DL assignment) for a specific PDSCH. If there are two or more PUCCH resources in the subset, the base station may allocate one PUCCH resource (among a plurality of PUCCH resources in the subset) to the UE in an implicit manner based on one or more of the following variables:

[1] a (starting) CCE index in which the DL assignment is transmitted;

[2] a DL control region index in which the DL assignment is transmitted;

[3] a (starting) PRB index of a PDSCH region indicated by the DL assignment;

[4] HARQ-ACK timing indicated by the DL assignment; and

[5] a bandwidth part (BWP) index indicated by the DL assignment.

In this case, if the base station instructs the UE to transmit HARQ-ACKs for a plurality of PDSCHs in the same time resource (or the same PUCCH resource) (from the perspective of slot and/or symbol), the UE may utilize one or more of the following variables when assigned a PUCCH resource in an implicit manner (implicit mapping) in a subset of the PUCCH resource set indicated by the base station.

1] a (starting) CCE index in which the DL assignment (corresponding to a PDSCH received last by the UE (from the perspective of DAI) among the plurality of PDSCHs) is transmitted;

2] a DL control region index in which the DL assignment (corresponding to a PDSCH received last by the UE (from the perspective of DAI) among the plurality of PDSCHs) is transmitted;

3] (a (starting) PRB index of a PDSCH region indicated by the DL assignment (corresponding to a PDSCH received last by the UE (from the perspective of DAI) among the plurality of PDSCHs);

4] HARQ-ACK timing indicated by the DL assignment (corresponding to a PDSCH received last by the UE (from the perspective of DAI) among the plurality of PDSCHs);

5] a bandwidth part (BWP) index indicated by the DL assignment (corresponding to a PDSCH received last by the UE (from the perspective of DAI) among the plurality of PDSCHs).

Here, the base station may schedule a variable for determining the implicit mapping so as to have the same value for some last DL assignments (from the perspective of DAI).

Here, if a semi-static codebook is configured, the last received PDSCH may be a PDSCH having the highest (or lowest) slot index and the lowest (or highest) CC index among a plurality of PDSCHs carrying the HARQ-ACK in the same time resource (or the same PUCCH resource) (in terms of slots and/or symbols).

As a specific example, if the UE selects a PUCCH resource in a (selected) subset (in the PUCCH resource set) in an implicit manner (implicit mapping) based on a (DL assignment) CCE index corresponding to each PDSCH, the UE may transmit HARQ-ACKs for the plurality of PDSCHs in the same PUCCH resource (in a manner of ACK/NACK bundling, ACK/NACK multiplexing, or the like) only when the base station matches all the CCE indexes with the plurality of PDSCHs. This configuration may greatly restrict scheduling by the base station. As a method for addressing this issue, the UE may select a PUCCH resource in the (selected) subset (in the PUCCH resource set) in an implicit manner (implicit mapping) based on a (DL assignment) CCE index corresponding to the last received PDSCH (from the DAI perspective). Thereby, scheduling restriction on the base station may be further relieved.

In addition, a search space, which is a region in which the UE performs PDCCH detection in terms of a control channel element (CCE) index in the NR system according to the present invention, may be defined as discussed below.

10.2 UE Procedure for Determining Physical Downlink Control Channel Assignment in UE-Specific Search Space For each serving cell, higher layer signaling configures a UE with P control resource sets. For control resource set p, $0 \leq p < P$, the configuration includes:

a first symbol index provided by higher layer parameter CORESET-start-symb;

a number of consecutive symbols provided by higher layer parameter CORESET-time-duration;

a set of resource blocks provided by higher layer parameter CORESET-freq-dom;

a CCE-to-REG mapping provided by higher layer parameter CORESET-CCE-to-REG-mapping;

a REG bundle size, in case of interleaved CCE-to-REG mapping, provided by higher layer parameter CORESET-REG-bundle-size;

antenna port quasi-collocation provided by higher layer parameter CORESET-TCI-StateRefId.

If the UE is not configured with higher layer parameter CORESET-TCI-StateRefId, the UE assumes that the DMRS antenna port associated with PDCCH reception in the UE-specific search space and the DMRS antenna port associated with PBCH reception are quasi-collocated with respect to delay spread, Doppler spread, Doppler shift, average delay, and spatial Rx parameters.

For each serving cell and for each DCI format with CRC scrambled by C-RNTI or SPS/grant-free RNTI(s) that a UE is configured to monitor PDCCH, the UE is configured the following:

a set of control resource sets by higher layer parameter DCI-to-CORESET-map;

for each control resource set in the set of control resource sets a number of PDCCH candidates per CCE aggregation level L by higher layer parameter Num-PDCCH-cand;

a PDCCH monitoring periodicity of $k_p$ slots by higher layer parameter Monitoring-periodicity-PDCCH-slot;

a PDCCH monitoring offset of $o_p$ slots, where $0 \leq o_p < k_p$, by higher layer parameter Monitoring-offset-PDCCH-slot;

a PDCCH monitoring pattern within a slot, indicating first symbol(s) of the control resource set within a slot for PDCCH monitoring, by higher layer parameter Monitoring-PDCCH-symbol pattern.

Each control resource set includes a set of CCEs numbered from 0 to $N_{CCE,p}-1$ where $N_{CCE,p}$ is the number of CCEs in control resource set p.

The sets of PDCCH candidates that a UE monitors are defined in terms of PDCCH UE-specific search spaces. A PDCCH UE-specific search space $S_{k_p}^{(L)}$ at CCE aggregation level $L \in \{1, 2, 4, 8\}$ is defined by a set of PDCCH candidates for CCE aggregation level L.

If a UE is configured with higher layer parameter CrossCarrierSchedulingConfig for a serving cell the carrier indicator field value corresponds to the value indicated by CrossCarrierSchedulingConfig.

For a serving call on which UE monitors PDCCH candidates in a UE-specific search space, if the UE is not configured with a carrier indicator field, the UE shall monitor the PDCCH candidates without carrier indicator field. For a serving cell on which a UE monitors PDCCH candidates in a UE-specific search space, if a UE is configured with a carrier indicator filed, the UE shall monitor the PDCCH candidates with carrier indicator field.

A UE is not expected to monitor PDCCH candidates on a secondary cell if the UE is configured to monitor PDCCH candidates with carrier indicator fields corresponding to that secondary cell in another serving cell. For the serving cell on which the UE monitors PDCCH candidates, the UE shall monitor PDCCH candidates at least for the same serving cell.

For a control resource set p, the CCEs corresponding to PDCCH candidate $m_{n_{CI}}$ of the search space for a serving cell corresponding to carrier indicator filed value $n_{CI}$ are given by $$L \cdot \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \bmod \lfloor N_{CCE,p}/L \rfloor \right\} + i$$

where $Y_{p,k_p} = (A_p \cdot Y_{p,k_p-1}) \bmod D, Y_{p,-1} = n_{RNTI} \neq 0, A_0 = 39827,$
$A_1 = 39829, [A_{P-1} = ?],$ and $D = 65537; i = 0, \ldots, L-1;$ $n_{CI}$ is the carrier indicator field value if the UE is configured with a carrier indicator field for the serving cell on which PDCCH is monitored; otherwise $n_{CI} = 0$;

$N_{CCE,p}$ is the number of CCEs in control resource set p that is configured to the UE by higher layers for the DCI format in control resource set p;

$M_{p,max}^{(L)}$ is the maximum number of PDCCH candidates among all configured DCI, formats over all configured $n_{CI}$ values for a CCE aggregation level L in control resource set p;

$m_{n_{CI}} = 0, \ldots, M_{p,n_{CI}}^{(L)} - 1$, where $M_{p,n_{CI}}^{(L)}$ is the number of PDCCH candidates the UE is configured to monitor for aggregation level L for a serving cell corresponding to $n_{CI}$;

The RNTI value used for I/RNTI is defined in [6, TS 38.214].

Here, the base station may configure a PUCCH resource set (for HARQ-ACK transmission) through a higher layer or remaining system information (RMSI), and indicate a subset in the PUCCH resource set (for HARQ-ACK transmission) through DCI (e.g., DL assignment) for a specific PDSCH. If there are two or more PUCCH resources in the subset, the base station may allocate one PUCCH resource (among a plurality of PUCCH resources in the subset) in an implicit manner (implicit mapping) based on one or more of the following variables:

[1] a (starting) CCE index in which the DL assignment is transmitted;

[2] a PDCCH candidate index in which the DL assignment is transmitted;

[3] a DL control region index in which the DL assignment is transmitted;

[4] a (starting) PRB index of a PDSCH region indicated by the DL assignment;

[5] HARQ-ACK timing indicated by the DL assignment; and

[6] a bandwidth part (BWP) index indicated by the DL assignment.

In this case, when the base station instructs the UE to transmit HARQ-ACKs for a plurality of PDSCHs in the same time resource (or the same PUCCH resource) (in terms of slot and/or symbol), the implicit-manner (implicit mapping) operation of the UE on a PUCCH resource (in a specific PUCCH subset indicated by the ARI) may be applied only to PDSCHs as follows:

a PDSCH received last in terms of the DAI;

a PDSCH having the highest (lowest) component carrier (CC) index and/or the highest (or lowest) slot index.

For example, when the number of PUCCH resources in the PUCCH subset selected by the DCI is $M_{PUCCH}$, the base station may allocate one PUCCH resource (of the plurality of PUCCH resources in the subset) in an implicit manner (implicit mapping) as follows.

In a specific example, the UE may apply ceiling (or flooring) to a value obtained by dividing the (starting) CCE index in which the DL assignment is transmitted by the CCE aggregation level and apply a modulo operation for $M_{PUCCH}$ to the value obtained by applying ceiling (or flooring), thereby obtaining the final PUCCH resource index (in the PUCCH subset). For example, when the search space is designed as shown in Table 5, PUCCH resource index k allocated according to the method described above may be calculated by the following equation.

$$k = \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \bmod \lfloor N_{CCE,p}/L \rfloor \right\} \bmod M_{PUCCH} \quad \text{Equation 1}$$

In another example, the UE may derive the final PUCCH resource index (in the PUCCH subset) by applying a modulo operation for $M_{PUCCH}$ to a PDCCH candidate index in which the DL assignment is transmitted. For example, when the search space is designed as shown in Table 5, PUCCH resource index k allocated according to the method described above may be calculated by the following equation.

$$k = m_{n_{CI}} \bmod M_{PUCCH} \quad \text{Equation 2}$$

As a variant example, the base station may allocate (or indicate) the UL control region (or HARQ-ACK resource group or PUCCH resource group) in an implicit manner based on one or more of the following variables:

1) a (starting) CCE index in which the DL assignment is transmitted;

2) a DL control region index in which the DL assignment is transmitted;

3) a (starting) PRB index of a PDSCH region indicated by the DL assignment; and

4) HARQ-ACK timing indicated by the DL assignment.

The base station then may dynamically indicate one of HARQ-ACK resource (or PUCCH resource) candidates allocated (or indicated) in the implicit manner, through a specific bit field (e.g., ARI) in DCI (e.g., DL assignment).

Here, the base station may configure the PUCCH resource set, an indication target of the ARI, to be determined according to the implicit manner based on the DL assignment transmission resource and/or the PDSCH transmission resource or to be determined as a specific single PUCCH resource set (through a higher layer signal or the like). In other words, the base station may configure a plurality of PUCCH resource sets each consisting of a plurality of PUCCH resources (wherein which of the PUCCH resource sets is to be used for HARQ-ACK transmission by the UE may be implicitly determined, and a PUCCH that is to be actually used by the UE in the determined set may be indicated by the ARI), or configure, for the UE, whether to configure the plurality of PUCCH resources in only one PUCCH resource set (wherein a PUCCH resource to be actually used by the UE in the PUCCH resource set may be indicated by the ARI).

In another variant example, with a plurality of PUCCH resource pools configured by the base station, the base station may indicate one PUCCH resource pool through UE (group) common DCI, and indicate a specific PUCCH resource in the PUCCH resource pool in an implicit manner based on one or more of the following variables:

1> a (starting) CCE index in which the DL assignment is transmitted;

2> a DL control region index in which the DL assignment is transmitted;

3> a (starting) PRB index of a PDSCH region indicated by the DL assignment; and

4> HARQ-ACK timing indicated by the DL assignment.

In another variant example, with a plurality of PUCCH resource sets configured by the base station, the base station may indicate one PUCCH resource set through UE (group) common DCI, and then indicate a specific PUCCH resource in the PUCCH resource set using a specific bit field (e.g., ARI) in the DCI.

The second PUCCH resource allocation method may be applied in combination with other proposals of the present invention as long as they do not conflict with each other.

3.1.3. Third PUCCH Resource Allocation Method

The base station may configure change to one of a polling mode or a non-polling mode for the UE using a higher layer signal or DCI, and indicate a HARQ-ACK resource (or a PUCCH resource) according to each mode as follows.

(1) For the polling mode, the base station indicates a HARQ-ACK resource (or PUCCH resource) through polling DCI. Here, the polling DCI may be the same as the DL assignment or may be separate DCI.

(2) For the non-polling mode, the base station sends an indication of a HARQ-ACK resource (or PUCCH resource) through every DL assignment.

More specifically, when the base station is capable of configuring the polling mode and the non-polling mode for the UE, the DCIs to indicate a HARQ-ACK resource (or PUCCH resource) may be distinguished from each other.

For example, for the polling mode, polling DCI instructing the polling operation may indicate the HARQ-ACK resource (or PUCCH resource). If the polling DCI is designed as a DCI separate from the DL assignment, the bit field indicating the HARQ-ACK resource (or PUCCH resource) in the DL assignment may be omitted, which is preferable in terms of DL control overhead.

On the other hand, for the non-polling mode, it may be preferable to include a field indicating a HARQ-ACK resource (or PUCCH resource) for each DL assignment since the HARQ-ACK transmission time may differ among PDSCHs.

The third PUCCH resource allocation method may be applied in combination with other proposals of the present invention as long as they do not conflict with each other.

3.1.4. Fourth PUCCH Resource Allocation Method

The base station may perform DL assignment using 2-step DCI which is based on a first DCI (e.g., 1st DCI) and a second DCI (e.g., 2nd DCI). In this case, the base station may indicate one of N HARQ-ACK resource (or PUCCH resource) sets through the first DCI, and dynamically indicate, through the second DCI, one of M HARQ-ACK resources (or PUCCH resources) in the HARQ-ACK resource (or PUCCH resource) set selected through the first DCI.

Here, the N HARQ-ACK resource (or PUCCH resource) sets may be configured in advance through a higher layer signal of the base station.

If the second DCI indicating a HARQ-ACK resource (or a PUCCH resource) set is absent, the UE may assume, on the assumption of a default HARQ-ACK resource (or PUCCH resource) (that is predetermined or configured a higher layer signal), that a resource indicated by the first DCI among the M HARQ-ACK resources (or PUCCH resources) in the default HARQ-ACK resource (or PUCCH resource) set is the HARQ-ACK resource.

When the base station configures a HARQ-ACK resource (or PUCCH resource) set using the second DCI, the base station may also deliver information on a valid time interval for the HARQ-ACK resource (or PUCCH resource) set.

Figure 12:
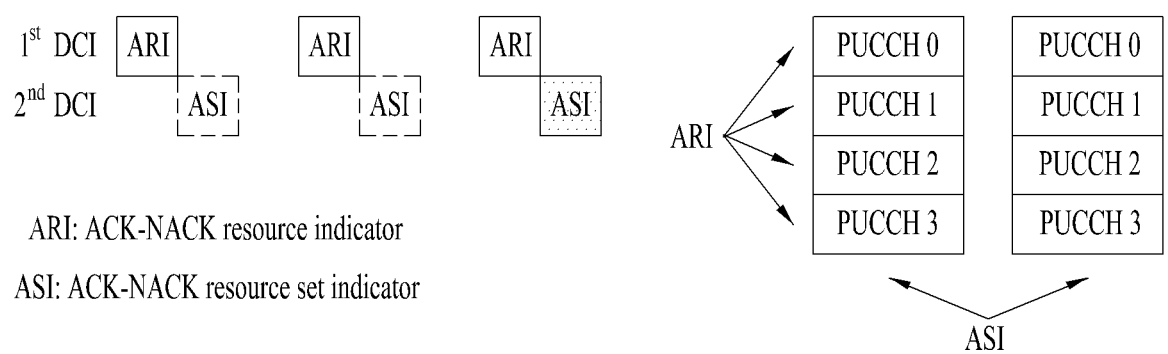
FIG. 12 is a diagram schematically illustrating an operation of a base station indicating a HARQ-ACK resource set and HARQ-ACK resources in a selected resource set through two DCIs.

FIG. 12 is a diagram schematically illustrating an operation of a base station indicating a HARQ-ACK resource set and HARQ-ACK resources in a selected resource set through two DCIs.

As shown in FIG. 12, the base station may indicate one of two HARQ-ACK resource sets using a 1-bit ACK-NACK resource set indicator (ASI), which is included in the second DCI, and indicate one of four HARQ-ACK resources in the selected HARQ-ACK resource set using a 2-bit ACK-NACK resource indicator (ARI), which is included in the first DCI. Here, the ASI transmitted through the second DCI may be opportunistically transmitted only when needed by the base station, and the first DCI may indicate presence or absence of the ASI in the second DCI.

With the configuration described above, flexibility for HARQ-ACK resource indication may be enhanced and fixed DL control overhead may be lowered.

The fourth PUCCH resource allocation method may be applied in combination with other proposals of the present invention as long as they do not conflict with each other.

3.1.5. Fifth PUCCH Resource Allocation Method

When the base station indicates a HARQ-ACK resource (or a PUCCH resource) to the UE, the base station may jointly indicate a combination of a DL assignment-to-DL data delay and a DL data-to-HARQ-ACK delay.

More specifically, when the base station indicates one of a plurality of states using a single bit field, the one of the plurality of states may refer to a combination of a DL assignment-to-DL data delay value and a DL data-to-HARQ-ACK delay value.

In one example, the base station may indicate a HARQ timing X. In this case, each HARQ timing X may correspond to a combination of a DL assignment-to-DL data delay value and a DL data-to-HARQ-ACK delay value, such as HARQ timing 1={DL assignment to DL data delay=A1, DL data to HARQ-ACK delay=B1}, HARQ timing 2={DL assignment to DL data delay=A2, DL data to HARQ-ACK delay=B2}, . . . .

The fifth PUCCH resource allocation method may be applied in combination with other proposals of the present invention as long as they do not conflict with each other.

In the following description, it is assumed that a PUCCH resource pool means a set composed of a plurality of PUCCH resources, and a physical resource block (PRB) means a basic unit for resource allocation in the time and frequency resource regions.

In the following description, a search space may refer to logical (or physical) resources in which the UE actually performs detection of downlink control information (DCI).

Also, in the following description, uplink control information (UCI) may include information such as HARQ-ACK and channel state information (CSI) feedback.

In the following description, a random access channel (RACH) procedure may mean a procedure consisting of the following four steps. In particular, from the perspective of the base station, the RACH procedure may mean Step 2 and/or Step 4.

Step 1: Transmission of random access channel (RACH) preamble.

Step 2: Transmission of random access response (RAR) of the base station (in response to the RACH preamble), wherein the RAR may include a temporary UE ID.

Step 3: Transmission of a third message (e.g., RRC connection request message) of the UE (in response to the RAR), wherein the third message may include a UE identity.

Step 4: Transmission of a fourth message (e.g., Msg.4, contention resolution message) of the base station (in response to the third message).

3.1.6. Sixth PUCCH Resource Allocation Method

The base station may deliver the configuration information about the default PUCCH resource pool to the UE using one of the following methods:

(1) A pre-agreed scheme;

(2) Transmitting broadcast information (e.g., a master information block (MIB)) and/or system information (e.g., a system information block (SIB)) containing (UE common) default PUCCH resource pool configuration information;

(3) Transmitting an RAR containing (UE specific) default PUCCH resource pool configuration information in the RACH procedure; and (4) Transmitting the fourth message containing (UE specific) default PUCCH resource pool configuration information in the RACH procedure.

Here, a specific PUCCH resource for transmitting UCI (about a specific PDSCH) in the default PUCCH resource pool may be indicated using one of the following methods:

1) Indicate a specific PUCCH resource in the default PUCCH resource pool through DCI (for scheduling the specific PDSCH);

2) Indicate a PUCCH resource in an implicit manner based on DL control resource allocation information, DL data resource allocation information, and/or HARQ-ACK timing information.

Here, the UE may perform the default PUCCH resource pool-based PUCCH resource allocation in the following cases.

1> when the PUCCH resource pool (UE specific) is not applied (or configured) through a higher layer signal (e.g., RRC signaling);

2> when HARQ-ACK corresponding to a specific DCI format is transmitted;

3> when HARQ-ACK corresponding to a specific search space (e.g., a common search space) is transmitted; and 4) when HARQ-ACK corresponding to specific data (e.g., Msg. 4) is transmitted.

More specifically, in the NR system to which the present invention is applicable, the base station may configure a PUCCH resource set including a plurality of PUCCH resources through a higher layer signal (e.g., RRC signaling) and may indicate, through the DCI (for scheduling a PDSCH), a specific PUCCH resource in the PUCCH resource set.

However, immediately after the RACH procedure, the UE may not have received information about the PUCCH resource set through a higher layer signal yet. Considering this situation, the following default PUCCH resource allocation methods may be considered.

For example, the base station may configure a (UE specific) default PUCCH resource set through the RAR (or Msg. 4) in the RACH procedure, and then indicate a specific PUCCH resource in the default PUCCH resource set through the DCI (for scheduling a PDSCH).

In another example, the base station may configure a (UE common) default PUCCH resource set through the system information, and then indicate a specific PUCCH resource in the default PUCCH resource set in an implicit manner based on resource allocation information in the DCI (for scheduling a PDSCH) or resource allocation information about the PDSCH. Then, the UE may utilize the default PUCCH resource set-based PUCCH resource allocation scheme until the base station configures a (UE specific) PUCCH resource set through a higher layer signal (e.g., RRC signaling). If a (UE specific) PUCCH resource pool is configured through a higher layer signal (e.g., RRC signaling) thereafter, the UE may perform PUCCH resource allocation based on the configured PUCCH resource set. For example, the base station may allocate a PUCCH resource in an implicit manner using the default PUCCH allocation method as in the first PUCCH resource allocation method described above, and may indicate and allocate a specific PUCCH resource in the configured PUCCH resource set through a higher layer signal.

The sixth PUCCH resource allocation method may be applied in combination with other proposals of the present invention as long as they do not conflict with each other.

3.1.7. Seventh PUCCH Resource Allocation Method

The base station may configure a PUCCH resource pool through a higher layer signal and allocate a specific PUCCH resource in the configured PUCCH resource pool through DCI. The UE may implement the default PUCCH resource allocation for UCI transmission (for a specific PDSCH) until the PUCCH resource pool is configured therefor as follows:

(1) Allocating a PUCCH resource in an implicit manner based on DL control resource allocation information, DL data resource allocation information, and/or HARQ-ACK timing information (e.g., allocating a PUCCH resource according to a specific rule);

(2) Allocating a specific PUCCH resource through broadcast information (e.g., MIB), system information (e.g., SIB), RAR, and/or Msg. 4;

(3) Configuring the default PUCCH resource pool through broadcast information (e.g., MIB), system information (e.g., SIB), RAR, and/or Msg. 4 and allocating a specific PUCCH resource in the default PUCCH resource pool through the DCI.

Here, the default PUCCH resource allocation may be implemented even when HARQ-ACK corresponding to a specific DCI format, a specific search space (e.g., a common search space) or specific data (e.g., Msg. 4) is transmitted.

More specifically, in the NR system to which the present invention is applicable, the base station may configure a PUCCH resource set including a plurality of PUCCH resources through a higher layer signal (e.g., RRC signaling) and may indicate, through the DCI (for scheduling a PDSCH), a specific PUCCH resource in the PUCCH resource set.

However, immediately after the RACH procedure, the UE may not have received information about the PUCCH resource set through a higher layer signal yet. Considering this situation, the following default PUCCH resource allocation methods may be considered.

For example, the base station may configure a (UE specific) default PUCCH resource set through the RAR (or Msg. 4) in the RACH procedure, and then indicate a specific PUCCH resource in the default PUCCH resource set through the DCI (for scheduling a PDSCH). In another example, the base station may indicate a specific PUCCH resource in the default PUCCH resource set in an implicit manner based on resource allocation information in the DCI (for scheduling a PDSCH) or resource allocation information about the PDSCH. Then, the UE may utilize the default PUCCH resource set-based PUCCH resource allocation scheme until the base station configures a (UE specific) PUCCH resource set through a higher layer signal (e.g., RRC signaling). If a (UE specific) PUCCH resource pool is configured through a higher layer signal (e.g., RRC signaling) thereafter, the UE may perform PUCCH resource allocation based on the configured PUCCH resource set. For example, the base station may allocate a PUCCH resource in an implicit manner using the default PUCCH allocation method as in the first PUCCH resource allocation method described above, and may indicate and allocate a specific PUCCH resource in the configured PUCCH resource set through a higher layer signal.

In summary, the UE may define a default PUCCH resource used for HARQ-ACK transmission according to reception of DL data, HARQ-ACK transmission corresponding to a specific DCI format, a specific search space (e.g., common search space), and/or specific DL data (e.g., Msg. 4) until it receives a (UE-specifically) configured PUCCH resource for HARQ-ACK transmission from the base station.

Herein, the default PUCCH resource may be configured through a specific broadcast signal, specific system information, an RAR, and/or Msg4, or may be determined based on a DL data transmission resource and/or DL control resource used for DCI transmission for scheduling the corresponding DL data according to a specific rule.

The seventh PUCCH resource allocation method may be applied in combination with other proposals of the present invention as long as they do not conflict with each other.

3.1.8. Eighth PUCCH Resource Allocation Method

The base station may configure, through a semi-static higher layer signal (e.g., RRC signaling), a single (UE specific) PUCCH type or a plurality of (UE specific) PUCCH types for a PUCCH carrying HARQ-ACK information for PDSCH(s) scheduled through a specific DL assignment. For a PDSCH transmitted before the (UE specific) PUCCH type is configured for the UE (or before the RRC connection) or a PDSCH (and/or Msg4 transmission) scheduled through the DCI transmitted in the UE (group) common search space, the base station may deliver information about a single default PUCCH type or a plurality of default PUCCH types to be used by the UE using one of the following methods:

(1) A pre-agreed scheme (e.g., a type with the widest coverage among the PUCCH types);

(2) Transmitting broadcast information (e.g., a master information block (MIB)) and/or system information (e.g., a system information block (SIB)) containing (UE common) default PUCCH type information;

(3) Transmitting an RAR (or Msg4) containing (UE specific) default PUCCH type information in the RACH procedure.

When a plurality of default PUCCH types is configured, a PUCCH type to be used for specific PUCCH transmission among the plurality of default PUCCH types may be determined using one or more of the following methods:

1) Indicate a specific PUCCH type (among the plurality of default PUCCH types) using a specific bit field in DCI (e.g., DL assignment) corresponding to PUCCH transmission (explicit manner), wherein the bit field may be interpreted as a bit field indicating a PUCCH transmission time (e.g., UL timing) after the UE receives a configuration of a (UE specific) PUCCH type through a semi-static higher layer signal (or the UE establishes an RRC connection);

2) Determine a specific default PUCCH type (among the plurality of default PUCCH types) based on one or more of the following variables (implicit manner):

A) Aggregation level of DCI (e.g., DL assignment) corresponding to PUCCH transmission;

B) Size (maximum size or size for each time point) of UCI payload which is a target of PUCCH transmission.

Here, the aggregation level may be information on how many default resource units constitute the DCI.

The default PUCCH type information described above may include one or more of the following kinds of information:

1> whether it is a short PUCCH or a long PUCCH, wherein, for reference, the PUCCH may be divided into a short PUCCH with less than N OFDM lengths and a long PUCCH with N or more OFDM symbol lengths;

2> PUCCH transmission duration (e.g., the number of OFDM symbols); and

3> a multiplexing scheme (e.g., Time Division Multiplexing (TDM), Frequency Division Multiplexing (FDM), etc.) between the reference signal (RS) and UCI in a PUCCH.

More specifically, when a UE is capable of receiving configuration of a single PUCCH type or a plurality of PUCCH types from a base station through a higher layer signal such as (UE specific) RRC signaling, a default PUCCH type for the UE to use until the time at which the RRC signaling can be received needs to be defined.

As a method for this, the UE may configure a specific PUCCH type (e.g., long PUCCH) having a relatively large coverage as the default PUCCH type.

However, if the UE always conservatively uses a PUCCH type that is advantageous in terms of coverage as the default PUCCH type, UEs that have not received configuration of a (UE specific) PUCCH type through a higher layer signal such as RRC yet may use a PUCCH type which is less efficient in terms of resource utilization. Therefore, when the base station configures a plurality of default PUCCH types for the UE, a specific PUCCH type of the plurality of default PUCCH types may be indicated by explicit signaling such as DCI, or may be determined by the aggregation level of a DL assignment corresponding to PUCCH transmission and/or the UCI payload size.

Accordingly, even before the UE receives configuration of a (UE-specific) PUCCH type through RRC signaling, the UE may select and apply a default PUCCH type that is efficient in terms of resource utilization according to the channel environment (e.g., Signal-to-Interference Noise Ratio (SINR)). For example, if the aggregation level of the DL assignment corresponding to PUCCH transmission is high, the base station may configure the default PUCCH type as the long PUCCH type, assuming that the UE is located in a relatively distant coverage area.

The eighth PUCCH resource allocation method may be applied in combination with other proposals of the present invention as long as they do not conflict with each other.

3.1.9. Ninth PUCCH Resource Allocation Method

The base station may configure, for the UE, through a semi-static higher layer signal (e.g., RRC signaling), a single (UE specific) PUCCH resource or a plurality of (UE specific) PUCCH resources for a PUCCH carrying HARQ-ACK information for PDSCH(s) scheduled through a specific DL assignment. For a PDSCH transmitted before the (UE specific) PUCCH type is configured for the UE (or before RRC connection) or a PDSCH (and/or Msg4 transmission) scheduled through the DCI transmitted in the UE (group) common search space, the base station may select a PUCCH resource in a (n+k)-th slot for transmitting HARQ-ACK information for the PDSCH(s) received in the n-th slot, based on one or more of the following variables:

(1) a (starting) CCE index in which the DL assignment for the PDSCH(s) is transmitted;

(2) a DL control region index in which the DL assignment for the PDSCH(s) is transmitted; and (3) a (starting) PRB index indicated by the DL assignment for the PDSCH(s).

Here, k may be determined according to default HARQ-ACK timing information.

The default HARQ-ACK timing information may be set using one of the following methods:

(1) A pre-agreed scheme;

(2) Transmitting broadcast information (e.g., a master information block (MIB)) and/or system information (e.g., a system information block (SIB)) containing (UE common) default HARQ-ACK timing information; and (3) Transmitting an RAR (or Msg4) containing (UE specific) default HARQ-ACK timing information in the RACH procedure.

The DL control/data resource (e.g., CCE/PRB index) in the n-th slot may be implicitly linked to a PUCCH resource (e.g., PUCCH resource index) in the (n+k)-th slot, and the UE may determine a PUCCH resource in the (n+k)-th slot through the PDSCH transmission resource in the n-th slot scheduled for the UE or a corresponding PDCCH transmission resource.

As a more specific example, it is assumed that the UE may receive configuration of a plurality of PUCCH resources through (UE specific) RRC signaling, and the base station may indicate one of the plurality of PUCCH resources through a specific bit field in the DL assignment. If the UE does not receive configuration of a specific PUCCH resource through the (UE specific) RRC signaling after completing the RACH procedure, PUCCH resource allocation may not be directly indicated through the DCI transmitted by the base station, but may be indirectly indicated through a CCE index in which the DL assignment is transmitted or the like.

At this time, the default information about the time at which a PUCCH resource for transmitting HARQ-ACK for the PDSCH received in the n-th slot is determined in an implicit manner also needs to be separately indicated. For example, the UE may acquire default HARQ-ACK timing information from system information such as SIB, and calculate a slot (e.g., the (n+k)-th slot) for transmitting a HARQ-ACK for the PDSCH received in the n-th slot, based on the default HARQ-ACK timing.

The ninth PUCCH resource allocation method may be applied in combination with other proposals of the present invention as long as they do not conflict with each other.

3.1.10. Tenth PUCCH Resource Allocation Method

If the UE does not receive a PUCCH resource from the base station through a higher layer signal (e.g., RRC signaling), the base station may configure (default) PUCCH resource information for the UE using one of the following methods:

(1) Configure a (cell common or UE group common) default PUCCH resource pool through SIB, RAR or Msg4;

(2) Configure a (UE-specific) default PUCCH resource set through RAR or Msg4;

(3) Configure a (UE specific) (single) PUCCH resource through RAR or Msg4.

When a default PUCCH resource pool (or a default PUCCH resource set) is configured according to the methods above, the base station may allocate a default PUCCH resource for transmitting UCI for a specific PDSCH, using one of the following methods:

1) Allocate a specific PUCCH resource according to an implicit PUCCH resource mapping rule defined based on a DCI resource (e.g., a starting or ending CCE index) in which the specific PDSCH has been scheduled, and/or a transmission PRB resource (e.g., a starting or ending PRB index) for the specific PDSCH, and/or the UCI transmission time, wherein the operation above may be applied when a (cell common or UE group common) default PUCCH resource pool is configured;

2) Allocate a specific PUCCH resource among a plurality of configured default PUCCH resources through a specific bit field in the DCI having scheduling the specific PDSCH. Here, the operation above may be applied when a (UE specific) default PUCCH resource set is configured.

In the description above, the specific PDSCH to which the default PUCCH resource is applied may be a PDSCH (and/or Msg4 transmission) scheduled through the DCI transmitted in a (cell common or UE (group) common) search space.

In addition, the UE may assume that PUCCH resources are indexed (according to a pre-agreed scheme or a scheme indicated in the system information (e.g., SIB or PBCH)) in a default UL control region in which (time and frequency-domain) transmission resource regions are defined, and the base station may configure a default PUCCH resource pool (or a default PUCCH resource set) for the UE, using the PUCCH resources corresponding to (all or part of) the indexes in the default UL control region.

1> A UL transmission resource region indicated on the PBCH (or a UL transmission resource region inferred from PBCH transmission resources);

2> A UL transmission resource region inferred from synchronization signal (SS) UL transmission resources;

3> A UL transmission resource region inferred from the common search space.

Herein, indexing of the PUCCH resources (in the default UL control region or targeted as the default PUCCH resources) may be determined based on a primary synchronization signal (PSS)/secondary synchronization signal (SSS)/physical broadcast channel (PBCH), transmission bandwidth (BW) or a minimum UE capable BW.

As a more specific example, a default UL control region that may be inferred from the (time and frequency) resources in which the base station transmits the PBCH may be defined, and the UE may assume indexing of a maximum of N PUCCH resources (in accordance with a pre-agreed scheme) in the default UL control region. For example, in the case of the TDD system, the UE may assume that the default UL control region is defined within the same bandwidth as the bandwidth in which the PBCH is transmitted. Then, the base station may configure a default PUCCH resource pool (or a default PUCCH resource set) for the UE in the form of an index set for (all or part of) the PUCCH resources in the default UL control region through the SIB (or RAR/Msg4).

If the UE has received configuration of a cell common (or UE common) default PUCCH resource pool, a specific PUCCH resource in the configured default PUCCH resource pool may be allocated according to an implicit PUCCH resource mapping rule cell-commonly (or UE-commonly) defined for UCI transmission for the specific PDSCH of the UE. Here, the implicit PUCCH resource mapping rule may be determined using resource information of the DCI for scheduling the specific PDSCH to be subjected to UCI transmission, and/or information about a resource in which the PDSCH is scheduled, and/or UL timing as an input value.

Alternatively, if the UE receives configuration of a (UE specific) default PUCCH resource set, the base station may dynamically allocate a specific PUCCH resource in the default PUCCH resource set through a specific bit field in the scheduling DCI for a specific PDSCH to ensure UCI transmission for the PDSCH. Here, the specific PDSCH may be a PDSCH (and/or Msg4 transmission) scheduled through the DCI transmitted in a (cell common or UE (group) common) search space.

As another example, if the UE does not receive a PUCCH resource from a base station through a higher layer signal (e.g., RRC signaling), the base station may deliver the information about a (default) PUCCH resource pool (or a default PUCCH resource set) using one of the following methods:

(A) When a plurality of RARs corresponding to a plurality of UEs is transmitted on a specific PDSCH, the default PUCCH resource pool information applied in common to the plurality of RARs (the plurality of UEs receiving the RARs) may be carried in the specific PDSCH (e.g., in the form of a MAC control element (CE)); and (B) When a plurality of RARs corresponding to a plurality of UEs is transmitted on a specific PDSCH, individual (UE common or UE specific) PUCCH resource set (or a single PUCCH resource) (or single PUCCH resource) information for each of the plurality of RARs may be carried in the specific PDSCH.

In this specification, for simplicity of explanation, when specific information A is transmitted to the UE in the form of information in the RAR (or separate information in the PDSCH on which the RAR is transmitted) as described above, it is said that specific information A has been transmitted in the RAR reception process. In other words, in this specification, stating that specific information A has been delivered in the RAR reception process may mean that specific information A has been delivered to the UE in the form of information contained in the RAR.

Thus, when the default PUCCH resource pool (or default PUCCH resource set) information is delivered in the RAR reception process, the base station may allocate a default PUCCH resource for transmitting the UCI for a specific PDSCH using one of the following methods:

1) Allocate a specific PUCCH resource according to an implicit PUCCH resource mapping rule defined based on a DCI resource (e.g., a starting or ending CCE index) in which the specific PDSCH has been scheduled, a transmission PRB resource (e.g., a starting or ending PRB index) for the specific PDSCH, and/or the UCI transmission time, wherein the operation above may be applied when a (cell common or UE group common) default PUCCH resource pool is configured; and B) Allocate a specific PUCCH resource among a plurality of configured default PUCCH resources using a specific bit field in the DCI scheduling the specific PDSCH, wherein the operation above may be applied when a (UE specific) default PUCCH resource set is configured.

In the configuration above, the specific PDSCH to which the default PUCCH resource is to be applied may be a PDSCH (and/or Msg4 transmission) scheduled through the DCI transmitted in the (cell common or UE (group) common) search space.

In addition, when a default PUCCH resource pool (or a PUCCH resource set or a single PUCCH resource) is delivered to the UE in the form of information in RAR (or separate information in the PDSCH on which the RAR is transmitted) in the RAR reception process, the UE may operate to update the default PUCCH resource pool (or PUCCH resource set or single PUCCH resource) with information delivered through the RAR received in the most recent RACH procedure and apply the same in the following case:

the UE receives information on a default PUCCH resource pool (or a PUCCH resource set or a single PUCCH resource) in the RAR reception process in a contention-based RACH procedure and then succeeds in contention resolution through reception of Msg 4, wherein, if UE contention resolution fails, the UE may ignore the default PUCCH resource pool (or PUCCH resource set or single PUCCH resource) information received in the RAR reception process in the RACH procedure.

In the configuration above, the UE may operate to apply the default PUCCH resource pool (or PUCCH resource set or single PUCCH set) delivered through the RAR in the RACH procedure to the HARQ-ACK transmission for Msg4 reception in a specific contention-based RACH procedure, regardless of the success of contention resolution.

In addition, in a contention-free RACH procedure, the UE may assume that the default PUCCH resource pool (or PUCCH resource set or single PUCCH resource) information is not received, or ignore the related information. Alternatively, the default PUCCH resource pool (or PUCCH resource set or single PUCCH resource) information may be configured so as not to be included in the content of the RAR (or the PDSCH carrying the RAR) involved in the contention-free RACH procedure.

If the UE does not receive configuration of DL HARQ timing (i.e., a time interval between a DL data reception time and a corresponding ACK/NACK transmission time) and/or UL HARQ timing (i.e., a time interval between a UL control (UL grant) reception time and a corresponding data reception time), the base station may deliver (default) DL DL/UL HARQ timing information for the UE using one of the following methods:

A> When a plurality of RARs corresponding to a plurality of UEs is transmitted on a specific PDSCH, the (default) DL/UL HARQ timing information applied in common to a plurality of RARs (a plurality of UEs receiving the same) may be carried in the specific PDSCH (e.g., in the form of a MAC control element (CE)); and B> When a plurality of RARs corresponding to a plurality of UEs is transmitted on a specific PDSCH, individual (default) DL/UL HARQ timing information for each of the plurality of RARs may be carried in the specific PDSCH.

In addition, when a default value for DL HARQ timing (i.e., the time interval between the DL data time and the corresponding ACK/NACK transmission time) and/or a default value for UL HARQ timing (i.e., the time interval between the DL control (UL grant) reception time and the corresponding UL data transmission time) are transmitted to the UE in the form of information in an RAR (or separate information in the PDSCH on which the RAR is transmitted) in the RAR reception process, the UE may operate to update the default UL/DL HARQ timing values with the information delivered through the RAR received in the most recent RACH procedure and apply the same in the following case:

the UE receives the (default) UL/DL HARQ timing information in the RAR reception process in a contention-based RACH procedure and succeeds in contention resolution through reception of Msg4, wherein, if UE contention resolution fails, the UE may ignore the (default) UL/DL HARQ timing information received in the RAR reception process in the RACH procedure.

In this case, the UE may operate to apply the (default) UL/DL HARQ timing to Msg3 transmission timing and/or HARQ-ACK transmission timing for Msg4 in a specific contention-based RACH procedure, regardless of the success of contention resolution.

In addition, in a contention free RACH procedure, the UE may assume that the default UL/DL HARQ timing information is not received, or ignore the related information.

Alternatively, the default UL/DL HARQ timing information may be configured so as not to be included in the RAR (or the PDSCH carrying the RAR) involved in the contention-free RACH procedure.

In addition, if the UE does not receive configuration of a PUCCH resource from the base station from a higher layer signal (e.g., RRC signaling), the base station may allocate a (default) PUCCH resource for the UE using one of the following methods.

[1] Explicit Indication

A superset (of PUCCH resources) is configured through broadcast information (e.g., MIB) and/or system information (e.g., SIB), or a superset (of PUCCH resources) corresponding to a RACH preamble that the UE has selected in the random access procedure is assumed.

[B] A subset is configured in a superset (of PUCCH resources) using an RAR.

[C] A specific PUCCH resource in the subset (of PUCCH resources) is indicated using a specific bit field in the (DL scheduling) DCI.

[2] Implicit Indication

[A] A superset (of PUCCH resources) is configured through broadcast information (e.g., MIB) and/or system information (e.g., SIB), or a superset (of PUCCH resources) corresponding to a RACH preamble that the UE has selected in the random access procedure is assumed.

[B] An RAR is used to configure a subset in the superset (of PUCCH resources). Here, when the RAR indicates a subset in the superset (of PUCCH resources), the RAR may indicate a specific subset in the form of an index for the subset. In other words, the subsets in the superset (of PUCCH resources) may be distinguished by subset indexes.

[C] A specific PUCCH resource in a subset (of PUCCH resources) is allocated according to an implicit PUCCH resource mapping rule defined based on a transmission resource (e.g., a starting or ending CCE index) for the (DL scheduling) DCI, and/or a transmission resource (e.g., a starting or ending PRB index) for the PDSCH, and/or a PUCCH transmission time UCI transmission time.

In the description above, the specific PDSCH to which the default PUCCH resource is applied may be a PDSCH (and/or Msg4 transmission) scheduled through the DCI transmitted in a (cell common or UE (group) common) search space.

The tenth PUCCH resource allocation method may be applied in combination with other proposals of the present invention as long as they do not conflict with each other.

3.1.11. Eleventh PUCCH Resource Allocation Method

The NR system to which the present invention is applicable supports a PUCCH (hereinafter referred to as a long PUCCH) which is composed of a relatively large number of OFDM symbols (e.g., four symbols or more) and supports a large UL coverage, and a PUCCH (hereinafter referred to as a short PUCCH) which is composed of a relatively small number of OFDM symbols (e.g., one or two symbols) and supports low latency transmission.

Here, the short PUCCH may have one or more transmission structures. For example, if the amount of uplink control information (UCI) to be transmitted on the short PUCCH is small (for example, 1 or 2 bits), the base station may allocate a sequence set composed of a plurality of sequences to the UE to the short PUCCH resource, and the UE may select and transmit a specific sequence corresponding to the UCI information to be transmitted among the sequences allocated in the short PUCCH resource. Here, the sequence may be designed to satisfy a low PAPR (peak to average power ratio). Hereinafter, the sequence-based short PUCCH structure is referred to as SEQ-PUCCH for simplicity of explanation.

If the amount of information of the UCI to be transmitted on the short PUCCH is large (for example, 3 bits or more), the base station may allocate REs for transmission of UCI to the UE and resource elements (REs) for transmission of a reference signal (RS) to the short PUCCH resource. In this case, the RS transmission REs may be distinguished from the UCI transmission REs by the FDM schemes on each symbol. The UE may generate coded bits for the UCI and then transmit modulation symbols for the coded bits in the REs for UCI transmission. Hereinafter, for convenience of explanation, a short PUCCH structure to which the FDM scheme (per symbol) is applied between the RS and the UCI is called an FDM-PUCCH.

Based on the configuration above, the base station may configure a PUCCH resource set through a higher layer signal and indicate a specific PUCCH resource in the PUCCH resource set through a (DL assignment) DCI. Here, a PUCCH resource for the short PUCCH in the PUCCH resource set configured by the base station may be configured to include one or more of the following kinds of information.

(1) Default Information Per Symbol (A) PUCCH format information. More specifically, information indicating whether the PUCCH structure is an SEQ-PUCCH or an FDM-PUCCH may be included.

(B) PUCCH Parameter Information

1) For example, in the case of the SEQ-PUCCH, the PUCCH parameter information may include the following information.

A) Sequence information. For example, if the sequence is a Zadoff-Chu (ZC) sequence or a CAZAC (Constant Amplitude Zero Autocorrelation) sequence, the sequence information may include a root index CS (cyclic shift). As another example, if the sequence is a pseudo-random sequence or a gold sequence, the sequence information may include an orthogonal cover code (OCC) and a scrambling seed.

B) Information on frequency resource length and comb resources (e.g., a gap between resources constituting a comb).

2) In another example, in the case of the FDM-PUCCH, the PUCCH parameter information may include the following information.

A) Demodulation reference signal (DM-RS) information. Specifically, the DM-RS information may include RS density, transmission power (e.g., power boosting), and sequence information. If the sequence is a Zadoff-Chu (ZC) sequence or a CAZAC (Constant Amplitude Zero Autocorrelation) sequence, the sequence information may include a root index CS (cyclic shift). As another example, if the sequence is a pseudo-random sequence or a gold sequence, the sequence information may include an orthogonal cover code (OCC) and a scrambling seed.

B) Information on frequency resource length and comb resources (e.g., a gap between resources constituting a comb).

(2) Additional Information Per Symbol (A) Offset information. Specifically, the offset information may include a frequency offset and CS offset information about a sequence or a DM-RS.

(B) Transmission diversity information. Specifically, the information may indicate whether a transmission diversity technique such as Space Orthogonal Resource Transmit Diversity (SORTD)/Space Frequency Block Codes (SFBC) or Space Time Block Codes (STBC) is applied.

In the configuration above, when the PUCCH is composed of a plurality of symbols, the information per symbol may be included in a PUCCH resource and transmitted to the UE.

More specifically, the base station may configure a 2-symbol PUCCH by configuring independent 1-symbol PUCCHs for two symbols. Here, the PUCCH resource information for each symbol may be configured to have information specified for the corresponding PUCCH depending on whether the PUCCH is an SEQ-PUCCH or an FDM-PUCCH. For example, if the PUCCH is an SEQ-PUCCH, information such as a length of a sequence, a root index and a CS resource, and information about symbol and frequency resource positions at which the sequence is actually transmitted may be provided to the UE. As another example, if the PUCCH is an FDM-PUCCH, the RS density of the DM-RS, the sequence information about the DM-RS, and the symbol and frequency resource position information may be provided to the UE.

The eleventh PUCCH resource allocation method may be applied in combination with other proposals of the present invention as long as they do not conflict with each other.

3.1.12. Twelfth PUCCH Resource Allocation Method

When the UE has received configuration of a plurality of bandwidth parts (BWPs), the base station may configure a PUCCH resource set for each BWP through a higher layer signal. Thereafter, when the base station indicates a specific PUCCH resource in the PUCCH resource set through the (DL assignment) DCI, the UE may assume that the PUCCH resource indicated by the DCI is a PUCCH resource set configured for the currently active BWP, and interpret the PUCCH resource indicated by the DCI on this assumption.

Herein, the BWP may refer to a specific frequency bandwidth (in the system bandwidth) and/or an OFDM numerology configured for the UE. The UE may receive configuration of a plurality of BWPs, but it is assumed that the UE actually performs signal transmission/reception through one BWP activated by the base station.

As a more specific example, it is assumed that a plurality of BWPs is configured for the UE and the number of BWPs in which the UE is allowed to actually transmit/receive signals is limited to one at a time. In this case, if the base station shares a PUCCH resource set regardless of the BWPs, the PUCCH resource set may include PUCCH resources that are not currently used, and accordingly the degree of freedom of dynamic PUCCH resource allocation within the actually active BWP may be limited.

Therefore, the present invention proposes that a PUCCH resource set be configured for each BWP and a PUCCH resource set actually used by the UE be assumed to be a PUCCH resource set configured for the BWP activated for the UE by the base station. That is, when the base station indicates a specific PUCCH resource in a PUCCH resource set through the DCI, the UE may regard the PUCCH resource set intended by the base station as a PUCCH resource set configured for the BWP currently activated for the UE.

In addition, when N BWPs are configured in total for the UE, priorities may be assigned to the BWPs. In this case, when K BWPs are active, a BWP having the highest priority among the active BWPs may be automatically designated as a primary BWP responsible for PUCCH transmission. Alternatively, the base station may indicate, through a signal for activating the BWPs, which of the K BWPs is the primary BWP responsible for PUCCH transmission.

In this case, the base station may configure a PUCCH resource set for each BWP through a higher layer signal, and the UE may assume that a PUCCH resource set configured in the primary BWP is to be used. In particular, when the base station indicates a specific PUCCH resource in the PUCCH resource set through the (DL assignment) DCI, the UE may assume that the PUCCH resource set indicated by the DCI is a PUCCH resource set configured in the primary BWP, and interpret the PUCCH resource indicated by the DCI on this assumption.

The twelfth PUCCH resource allocation method may be applied in combination with other proposals of the present invention as long as they do not conflict with each other.

Additionally, a detailed description will be given of a polling-based A/N feedback method proposed in the present invention in a case where HARQ-ACKs for a plurality of DL slots is aggregated and transmitted on a single PUCCH according to the present invention.

3.2. Polling-Based A/N Feedback Method 3.2.1. Polling DCI

If the base station supports a polling-based HARQ-ACK feedback operation, the base station may support one or more of the following configurations as polling DCI:

(1) DL assignment;

(2) UL grant;

(3) Special DCI, i.e., separate DCI other than the DL assignment and the UL grant.

Here, when the polling DCI is in the form of the special DCI, the special DCI may take the form of common DCI that may be detected by a plurality of UEs in common.

As a specific example, the base station may dynamically indicate HARQ-ACK transmission timing (hereinafter referred to as HARQ-ACK timing) for a PDSCH scheduled through a bit field in each DL assignment. In response, the UE may consider the DL assignment for which the HARQ-ACK timing is indicated as polling DCI. Here, the bit field indicating the HARQ-ACK timing may indicate a HARQ-ACK transmission time for the scheduled PDSCH or a "pending" state for pending HARQ-ACK transmission. Thus, if the HARQ-ACK transmission time is indicated through the DL assignment, the UE may aggregate HARQ-ACKs for the PDSCHs for which HARQ-ACK transmission has been held in the "pending" state before the current time, and transmit the aggregated HARQ-ACKs through the PUCCH resource for which the HARQ-ACK transmission time has been indicated.

As another example, the polling-based HARQ-ACK feedback operation may be indicated by separate DCI rather than by a DL assignment. For example, the base station may indicate, through the UL grant or the separate polling DCI, that HARQ-ACKs for the PDSCHs for which HARQ-ACK transmission has been held in the pending state before should be aggregated and transmitted in a specific PUCCH resource of specific HARQ-ACK timing.

Here, the separate polling DCI may be configured independently of data scheduling and take the form of common DCI detectable in common by a plurality of UEs. If the separate polling DCI takes the form of a common DCI type for a specific UE group, the bit field regions to be referred to by each UE in the polling DCI may be distinguished from each other. The bit field regions to be referred to by each UE may be pre-configured by the base station.

In addition, when the polling DCI is designed as separate special DCI, the payload size of the special DCI may be designed to be equal to the payload size of the DL assignment (or UL grant). In this case, some bits in the special DCI may be designed to be used for a virtual cyclic redundancy check (CRC). Therefore, the reliability of the special DCI may be enhanced while the number of times of blind decoding of the special DCI by the UE is maintained to be the same as that of other DCIs (e.g., DL assignment, UL grant, etc.).

The configuration for the polling DCI above may be applied in combination with other proposals of the present invention as long as they do not conflict with each other.

3.2.2. First Polling-Based A/N Feedback Method

When a base station indicates a DAI in a DL assignment, a UE that has received an instruction of the polling operation from the base station assumes a DAI of the latest PDSCH to be subjected to polling (hereinafter referred to as last DAI) as follows:

(1) Assuming that the DAI value indicated through the polling DCI by the base station is the last DAI;

(2) Assuming that the DAI value of the latest PDSCH detected by the UE up to the point in time for the polling operation indicated by the base station is the last DAI.

Then, the UE having received the instruction of the polling operation may aggregate HARQ-ACK information for the PDSCHs up to the scheduling position in order corresponding to the last DAI using one of the following methods and transmit the aggregated information through a single PUCCH (or a UCI transmission region in the PUSCH):

1) Configure a UCI payload by aggregating HARQ-ACK information for first to K-th PDSCHs (in a scheduling order) if the last DAI is determined to be at the K-th scheduling position in order;

2) Configure a UCI payload by aggregating HARQ-ACK information for N preceding DAIs including the last DAI if the last DAI is L (Last DAI=L);

If last DAI=K<L, configure a UCI payload with A/N (=HARQ-ACK) for the {N−(L−K)} preceding DAIS including the last DAI=K and with NACK for the L-K remaining DAIs after the last DAI=K.

At this time, the single PUCCH (or the UCI transmission region in the PUSCH) through which the aggregated HARQ-ACK information is transmitted may be indicated in the polling DCI.

In addition, the number of HARQ-ACKs to be subjected to polling (or the number of PDSCHs to be subjected to HARQ-ACK), N, may be set to a multiple of L, the maximum DAI value (or the number of values that the DAI may have).

As a specific example, suppose that the base station indicates a DAI per DL assignment, and then instructs the UE to aggregate HARQ-ACK information for preceding PDSCHs through the polling DCI. If the polling DCI does not include a DAI for the last PDSCH to be polled, it may happen that the last PDSCH intended as a polling target by the base station is different from the PDSCH recognized as a polling target by the UE. In this case, the HARQ-ACK payload configured according to the polling operation of the UE may differ from the expectation of the base station.

Therefore, the present invention proposes a method for signaling, by the base station, the DAI (hereinafter referred to as last DAI) of the latest PDSCH among PDSCHs that are polling targets (or HARQ-ACK aggregation targets) using the polling DCI.

Figure 13:
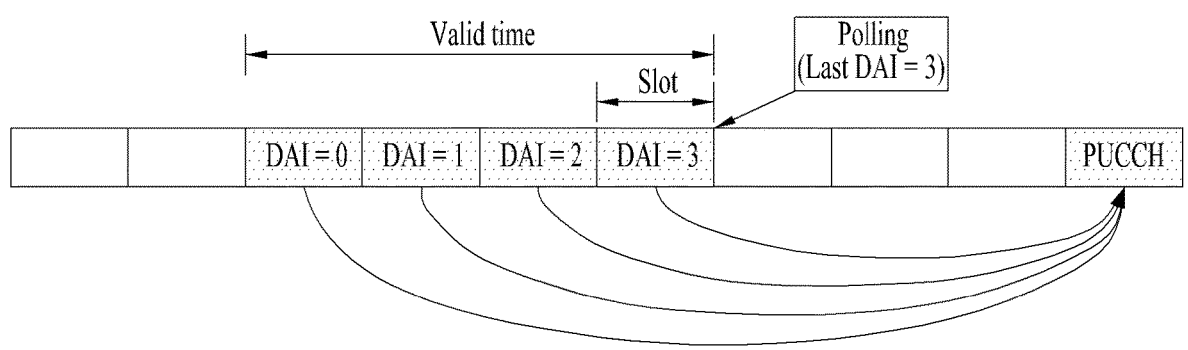
FIG. 13 is a diagram schematically illustrating a case where a PDSCH corresponding to the last DAI comes in a K (=4)-th scheduling position in order according to an embodiment of the present invention.

FIG. 13 is a diagram schematically illustrating a case where a PDSCH corresponding to the last DAI comes in a K (=4)-th scheduling position in order according to an embodiment of the present invention.

As shown in FIG. 13, if a PDSCH corresponding to the last DAI takes the K-th scheduling position in order, the UE receiving the polling DCI may aggregate HARQ-ACK information for PDSCHs from the PDSCH corresponding to the first scheduling position in order to the PDSCH corresponding to the K-th scheduling position in order and transmit the aggregated HARQ-ACK information through a single PUCCH (or a UCI transmission region in the PUSCH).

As another example, the base station may deliver, through a higher layer signal or DCI (e.g., polling DCI), the number of PDSCHs (e.g., N) that are aggregated by the polling operation in the DAI domain. In this case, if the last DAI is indicated by the polling DCI, the UE may recognize the PDSCHs which are targets of polling in a reverse order with respect to the last DAI.

Figure 14:
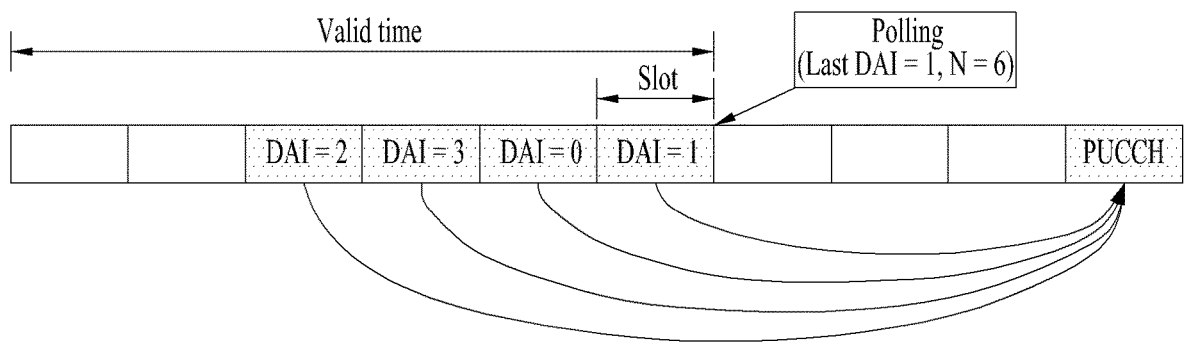
FIG. 14 is a diagram illustrating a case where the last DAI, M, is 1, the number of DAIs, L, is 4, and the number of PDSCHs aggregated by a polling operation, N, is 6 according to another embodiment of the present invention.

FIG. 14 is a diagram illustrating a case where the last DAI, M, is 1, the number of DAIs, L, is 4, and the number of PDSCHs aggregated by the polling operation, N, is 6 according to another embodiment of the present invention.

If the DAI value is one of 0, 1, . . . , and L−1 and the last DAI indicated by the polling DCI is M, the UE may assume that the DAI for the first polling target PDSCH is the last DAI, and then expect that the DAI for the P-th (P=2, 3, . . . , N) polling target PDSCH will be (M−P+1) mod L. That is, the UE may consider HARQ-ACKs for a set of N (latest) PDSCHs corresponding to DAI values M, (M−1) mod L, (M−2)mod L, . . . , (M−N+1)mod L arranged in reverse order in time with respect to the polling operation instruction time as polling targets.

As described above, according to the scheme illustrated in FIG. 13, in aggregating HARQ-ACKs, the payload size may be varied according to the value of the last DAI. On the other hand, according to the scheme illustrated in FIG. 14, the payload size may be determined in HARQ-ACK aggregation according to the number of PDSCHs, N, indicated by the base station. In other words, in FIG. 13, the UE only needs to configure a HARQ-ACK payload size corresponding to 4 PDSCHs. However, in FIG. 14, the UE needs to configure a HARQ-ACK payload size corresponding to N (e.g., 6) PDSCHs.

When the UE recognizes PDSCHs subjected to polling based on the DAI values, the base station may inform the UE of a time interval in which the polling target PDSCHs are present (with respect to the reception time of the polling DCI) through a higher layer signal or DCI (e.g., polling DCI). At this time, if a specific DAI value subjected to polling is not detected in the time interval, the UE may perform HARQ-ACK aggregation considering the HARQ-ACK for the corresponding DAI as NACK. In FIGS. 13 and 14, the time interval denoted by "valid time" may represent a time interval in which polling target PDSCHs are present with respect to the reception time of the polling DCI, and the base station may inform the UE of the time interval.

In addition, the base station may indicate a group ID for a plurality of PDSCHs through a DL assignment, wherein the UE may assume that a DAI value is allocated to a group of PDSCHs having the same group ID through cyclic repetition. That is, the counter of the UE for the PDSCH scheduling order based on the DAI value may be operated for each PDSCH group having the same group ID. Accordingly, the UE may implement the first polling-based A/N feedback method described above for the PDSCHs having the same group ID.

The first polling-based A/N feedback method may be applied in combination with other proposals of the present invention as long as they do not conflict with each other.

3.2.3. Second Polling-Based A/N Feedback Method

The base station may inform the UE of the payload size for the HARQ-ACK(s) aggregated by the polling operation using one of the following methods:

(1) Semi-static configuration through a higher layer signal;

(2) Dynamic configuration through polling DCI (or separate dynamic signaling).

Here, the number of HARQ-ACKs to be subjected to polling (or the number of PDSCHs to be subjected to HARQ-ACK), N, may be set to a multiple of L, the maximum DAI value (or the number of values that the DAI may have).

For example, if the base station instructs aggregation of HARQ-ACKs for N PDSCHs in the DAI domain, the UE may configure a payload by aggregating the HARQ-ACKs for the (latest) PDSCHs having N previous DAI values (e.g., M, (M−1)mod L, (M−2)mod L, . . . , (M−N)mod L, where L is a total number of states which a bit field indicating DAI values is capable of representing) with respect to the last DAI value (e.g., M) indicated by the polling DCI. At this time, the base station may set N, the number of polling target PDSCHs, for the UE in a semi-static manner through a higher layer signal or in a dynamic manner through DCI (e.g., polling DCI). For example, in the case where the base station indicates N through the DCI, the base station may pre-configure a candidate group of values of N through a higher layer signal and dynamically indicate a specific value in the candidate group through the DCI.

The second polling-based A/N feedback method may be applied in combination with other proposals of the present invention as long as they do not conflict with each other.

3.21.4. Third Polling-Based A/N Feedback Method

In the case where the UE operates the counter for a PDSCH scheduling order (hereinafter referred to as a DAI-based counter) based on a DAI value in a DL assignment, the UE may initialize the value of the DAI-based counter according to one of the following methods:

(1) Initialize the DAI-based counter in each certain (periodic) time interval;

(2) Initialize the DAI-based counter when a bit field indicating a DAI indicates specific state(s);

(3) Initialize the counter when the polling operation is instructed by the base station;

(4) Initialize the DAI-based counter when the base station designates a group assignment index (GAI) for a plurality of PDSCHs through the DL assignment and the state indicated by the GAI change;

(5) No separate initialization.

Here, the certain (periodic) time interval disclosed in item (1) may be predetermined (e.g., a radio frame) or may be set by the base station through a higher layer signal.

Specifically, when the UE aggregates HARQ-ACK information up to HARQ-ACK information for a PDSCH scheduling position in order corresponding to the last DAI as shown in FIG. 12, the UE must initialize the counter for the PDSCH scheduling order at a certain point in time. If the UE does not initialize the counter, the PDSCH scheduling position in order corresponding to the last DAI may increase infinitely, thereby excessively increasing the payload size of the aggregated HARQ-ACKs. Therefore, the UE needs to initialize the counter for the PDSCH scheduling order according to a certain condition.

As a method for this, the UE may initialize the DAI-based counter in a certain (periodic) time interval. For example, if a radio frame is defined in the NR system to which the present invention is applicable, the UE may initialize the DAI-based counter for the PDSCH scheduling order at the same time as the start of the radio frame. Alternatively, if the base station indicates a specific state or the polling operation using a bit field indicating a DAI value, the UE may initialize the DAI-based counter.

As another method, in the case where the base station indicates a group assignment index (GAI) for a plurality of PDSCHs through the DL assignment, the UE may initialize the DAI-based counter when the state indicated by the GAI changes.

For example, suppose that the DAI is 2 bits in size and the GAI is 1 bit in size. Next, suppose that the base station has assigned 0, 1, 2, 3, 0, 1, and 2 to the first to seventh PDSCHs, respectively, by cyclically repeating the DAI and then instructed a polling operation (hereinafter referred to as first polling) for the 7 PDSCHs. Suppose that, at a later point in time, the base station initializes the counter, assigns 0, 1, 2 and 3 to the first to fourth PDSCHs, respectively, by cyclically repeating the DAI, and then instructs a polling operation (hereinafter, second polling) for the 4 PDSCHs. In this case, if the UE fails to properly receive (e.g., misses) the first polling indication, the UE may determine that it has missed the eighth PDSCH and interpret the polling as being indicated for 12 PDSCHs, while the base station intended the first polling operation for the first seven PDSCHs and the second polling operation for the next four PDSCHs. In other words, the UE may determine that a polling indication has been received after the DAI values of 0, 1, 2, 3, 0, 1, 2, X, 0, 1, 2, and 3.

In order to address this issue, the base station may assign a GAI value of 0 to the first 7 PDSCHs and a GAI value of 1 to the next 4 PDSCHs. In this case, when the GAI value is changed, the UE may initialize the DAI-based counter for the PDSCH scheduling order and thus recognize that the base station has instructed the first polling for the seven PDSCHs and the second polling for the four PDSCHs. At this time, the polling DCI including the GAI value for the PDSCHs subjected to polling may be transmitted to the UE.

In contrast, as shown in FIG. 13, if PDSCHs corresponding to N DAI values cyclically repeated counterclockwise based on the last DAI value according to the number of polling target PDSCHs indicated by the base station are the targets of the polling operation, the UE may not need to initialize the DAI-based counter for the PDSCH scheduling order. In this case, the DAI value may indicate a relative scheduling position in order relative to adjacent PDSCHs rather than an absolute PDSCH scheduling position in order.

The third polling-based A/N feedback method may be applied in combination with other proposals of the present invention as long as they do not conflict with each other.

3.2.5. Fourth Polling-Based A/N Feedback Method

The base station may indicate, through the polling DCI, a time interval and/or a frequency resource set (e.g., a carrier) through which polling target PDSCHs are transmitted, the UE receiving the polling DCI in response may aggregate HARQ-ACKs using one of the following methods and transmit the same through a single PUCCH (or UCI transmission region in the PUSCH).

(1) Aggregate HARQ-ACKs for PDSCHs corresponding to the time interval indicated by the polling DCI and/or DAI values of 1, 2, . . . , and N (or the PDSCH scheduling positions in order indicated by the DAI values) in a frequency resource set and/or a time interval indicated by the polling DCI;

(2) Aggregate HARQ-ACKs for PDSCHs corresponding to all N scheduling units in a frequency resource set and/or a time interval indicated by the polling DCI.

Here, N may be a predetermined value, or a value set by the base station through a higher layer signal, or a value indicated by the polling DCI.

A single PUCCH (or the UCI transmission region in the PUSCH) through which the aggregated HARQ-ACKs are transmitted may be indicated in the polling DCI.

In addition, a PDSCH for which the HARQ-ACK transmission time and/or resources are indicated through the DL assignment rather than the polling DCI may be excluded from the polling (or HARQ-ACK aggregation) targets described above.

More specifically, the base station may indicate a transmission interval of a PDSCH which is a polling target through the polling DCI. In this case, the UE may aggregate HARQ-ACKs for PDSCHs corresponding to the DAI values of 1, 2, . . . , and N (or the PDSCH scheduling positions in order indicated by the DAI values) among the PDSCHs actually transmitted within the PDSCH transmission interval and transmit the aggregated HARQ-ACKs through a single PUCCH resource indicated by the polling DCI. If there is no PDSCH (or DL assignment) corresponding to a specific DAI value (or a specific PDSCH scheduling position in order), the UE may perform HARQ-ACK aggregation, considering HARQ-ACK corresponding to this DAI value as NACK. Alternatively, the UE may aggregate HARQ-ACKs for the respective PDSCHs, assuming that PDSCH transmission has been performed in all N scheduling units in the time interval and/or frequency resource indicated by the base station through the polling DCI. If PDSCH transmission is not actually performed in a specific scheduling unit, the UE may perform HARQ-ACK aggregation, considering HARQ-ACK corresponding to this PDSCH as NACK.

The fourth polling-based A/N feedback method may be applied in combination with other proposals of the present invention as long as they do not conflict with each other.

3.2.6. Fifth Polling-Based A/N Feedback Method

The base station may indicate, to the UE, whether to perform the polling operation in a semi-static manner through a higher layer signal.

If the polling operation described above is always supported in the NR system to which the present invention is applicable, additional control signaling overhead may occur according to the polling DCI. Therefore, it may be more efficient in terms of control signaling overhead for the base station to configure, for the UE, a "polling mode" in which the polling operation is supported or a "non-polling mode" in which the polling operation is not supported in a semi-static manner, if necessary.

If the base station is configured to support the polling operation for M slots for the UE, the number of existing N HARQ processes may be increased to N+M or more. In this case, the increased number of HARQ processes may be applied in an implicit manner or be separately set by the base station depending on whether the base station supports the polling operation.

The fifth polling-based A/N feedback method may be applied in combination with other proposals of the present invention as long as they do not conflict with each other.

3.2.7. Sixth Polling-Based A/N Feedback Method

In a case where the base station instructs polling for the same PUCCH (or UCI transmission region in the PUSCH) through different polling DCIs (e.g., multiple polling DCIs), the base station may signal an aggregation order of HARQ-ACK groups corresponding to the respective polling DCIs using one of the following methods.

(1) The polling DCI may include the order information about the polling DCIs. Accordingly, the UE may determine the aggregation order of HARQ-ACK groups based on the order information included in the polling DCIs.

(2) A radio network temporary identifier (RNTI) for polling DCIs may imply order information about the polling DCIs. Accordingly, the UE may determine the aggregation order of HARQ-ACK groups based on the order information implied by the RNTI for the polling DCIs.

More specifically, when the number of PDSCHs for which HARQ-ACKs may be aggregated through the polling DCI is N, the base station may instruct the UE to aggregate and transmit HARQ-ACKs for M*N PDSCHs through M polling DCIs according to the transmission capacity of the PUCCHs (for example, if the transmission capacity of the PUCCH is sufficient).

At this time, a HARQ-ACK aggregation order of a plurality of HARQ-ACK groups corresponding to a plurality of polling DCIs needs to be defined. For example, the order may be transmitted to the UE as the order information contained in the polling DCIs, or the UE may acquire the same in an implicit manner in the process of detecting polling DCIs. If the order information about the polling DCIs is indicated through a specific bit field in the polling DCIs, the order information may be indicated through a bit field representing L limited values similarly to the DAI, and the bit field may perform a counter function in a manner of cyclically repeating the values.

The sixth polling-based A/N feedback method may be applied in combination with other proposals of the present invention as long as they do not conflict with each other.

3.2.8. Seventh Polling-Based A/N Feedback Method

If there are PDSCHs having the same HARQ process index among the PDSCHs (or HARQ-ACKs) for which the base station has instructed the polling operation (to a single PUCCH (or PUSCH) resource) through the polling DCI, the UE may perform one of the following operations:

(1) Distinguishing between and aggregating HARQ-ACKs corresponding to the respective PDSCHs;

(2) Transmitting HARQ-ACKs for the same HARQ process only once.

Specifically, when the base station instructs a polling operation to a single PUCCH resource for an initially transmitted PDSCH and a retransmitted PDSCH, there may be PDSCHs (or HARQ-ACKs) for the same HARQ-ACK process among the HARQ processes (or HARQ-ACKs) for which the polling operation is instructed through the polling DCI.

In this case, even if the UE has the same HARQ process index, the UE may perform HARQ-ACK aggregation for the polling operation by easily distinguishing between the HARQ-ACKs for the respective PDSCHs.

However, if the initial transmission and the retransmission are not distinguished from each other as described above, the HARQ-ACK information for the same HARQ process index may redundantly occupy the UCI payload. In other words, the method above may be inefficient in terms of UL control signaling overhead. Accordingly, the UE may transmit HARQ-ACKs for the same HARQ process only once.

The seventh polling-based A/N feedback method may be applied in combination with other proposals of the present invention as long as they do not conflict with each other.

3.2.9. Eighth polling-based A/N feedback method

The base station may configure different PUCCH formats or different amounts of PUCCH resources for a PUCCH (PUCCH 1) for performing HARQ-ACK transmission for a plurality of PDSCHs and a PUCCH (PUCCH 2) for performing HARQ-ACK transmission for a single PDSCH.

Here, the different PUCCH formats or the different PUCCH resources may mean that the PUCCHs are transmitted through different numbers of symbols. For example, PUCCH 2 may correspond to a PUCCH (e.g., a short PUCCH) transmitted through one or two symbols, and PUCCH 1 may correspond to a PUCCH (e.g., a long PUCCH) transmitted through four or more symbols.

Specifically, when the base station instructs a polling operation for a plurality of PDSCHs, the size of the UL control payload to be transmitted by HARQ-ACK aggregation may be larger than the size of the UL control payload size for transmission of HARQ-ACKs for a single PDSCH. Therefore, PUCCH 1 may support transmission of a larger UCI payload size using a large number of PUCCH resources, and PUCCH 2 may support transmission of a smaller UCI payload size using a small number of PUCCH resources.

Accordingly, in the NR system according to the present invention, it is possible to support various PUCCH resources (e.g., short PUCCH, long PUCCH, etc.) for a specific UE, and therefore there is a need for configuration of more PUCCH resources for a specific UE than in the legacy LTE system. In this regard, if the second PUCCH resource allocation method described above is used, the UE may be assigned PUCCH resources through the 2-bit ARI and in an implicit manner without increasing signaling overhead compared to the legacy LTE system (even if the number of PUCCH resources configured for a specific UE increases with respect to the LTE system).

FIG. 15 is a diagram schematically illustrating a configuration for changing an aggregated HARQ-ACK configuration scheme depending on the number of polling target PDSCHs or the sum of polling target HARQ-ACK bits according to the present invention.

As shown in FIG. 15, for a PUCCH on which HARQ-ACK transmission is performed for a plurality of PDSCHs for which the base station has instructed the polling operation, the UE may change the PUCCH format or the amount of PUCCH resources of the PUCCH for HARQ-ACK transmission depending on the number of polling target PDSCHs (or HARQ-ACK bits to be aggregated). In addition, the UE may configure a different scheme for configuration of an aggregated HARQ-ACK payload for polling target PDSCHs depending on the number of polling target PDSCHs (or HARQ-ACK bits to be aggregated).

For example, suppose that there are L HARQ processes, a polling operation for N PDSCHs is instructed by the base station, and a HARQ-ACK bit size for each PDSCH is 1 bit. Here, the size of HARQ-ACK bits to be aggregated may be calculated as the sum of the HARQ-ACK bits for each PDSCH. For example, the bit size may be N bits.

At this time, if the N bits are fewer than L bits, the UE may aggregate and report the HARQ-ACK bits corresponding to each DAI value based on the DAI values as in the first polling-based A/N feedback method described above.

Alternatively, if the N bits are L bits or more, the UE may report HARQ-ACK information for each HARQ process.

Through the methods described above, the UE may fix the aggregated HARQ-ACK payload size to L bits.

The eighth polling-based A/N feedback method may be applied in combination with other proposals of the present invention as long as they do not conflict with each other.

3.2.10. Ninth Polling-Based A/N Feedback Method

The base station may pre-configure a plurality of HARQ process index groups and indicate a HARQ process index group to be subjected to polling through the polling DCI. In response, the UE may aggregate the HARQ-ACK information for the HARQ process indexes in the indicated HARQ process index group and transmit the aggregated HARQ process information through a single PUCCH (or a UCI transmission region in the PUSCH).

As a specific example, suppose that the base station has pre-configured two HARQ process index groups {0, 1, 2, 3} and {4, 5, 6, 7} through a higher layer signal. In this case, the base station may instruct the polling operation (aggregation and reporting of HARQ-ACKs) for a specific one of the two HARQ process index groups through a 1-bit size indicator in the polling DCI. This operation may prevent HARQ-ACKs from being redundantly aggregated for the initial transmission and retransmission.

Alternatively, instruction of a polling operation through the polling DCI may be implied through the operation of the polling DCI indicating a specific HARQ process index. For example, if the polling DCI indicates specific HARQ process index X, the UE may understand that a polling operation is to be performed on the HARQ process index group including the HARQ process index X (i.e., HARQ-ACKs for the HARQ process index group are to be aggregated and reported).

As a variant example, the base station may set HARQ process index value(s) which are used only to instruct the UE to perform a polling operation not for the scheduling purpose (through, for example, a pre-agreed scheme or a higher layer signal). Then, when the UE receives the HARQ process index for instructing the polling operation through the DL assignment, the UE may determine that the DL assignment does not instruct data scheduling, and use bit field(s) for redundancy version (RV) and/or a modulation and coding scheme (MCS) in the DL assignment to indicate a HARQ process index group to be subjected to polling.

The ninth polling-based A/N feedback method may be applied in combination with other proposals of the present invention as long as they do not conflict with each other.

3.2.11. Tenth Polling-Based A/N Feedback Method

The base station may inform the UE of a PDSCH that is excluded from the polling targets using one of the following methods:

(1) Indicate whether a PDSCH is excluded from polling targets through DCI (e.g., DL assignment);

(2) Indicate HARQ-ACK timing through a DCI (e.g., DL assignment) and regard the corresponding PDSCH as a PDSCH that is excluded from the polling targets if the DCI is not a polling DCI;

(3) Perform different UE ID-based (e.g., RNTI) CRC masking on the DCI for a polling target PDSCH and the DCI for a PDSCH that is excluded from the polling targets.

More specifically, there may be a case in which PDSCHs scheduled for the same UE have different latency requirements. In this case, HARQ-ACK reporting may be performed as soon as possible without performing the polling operation for a PDSCH with lower latency.

If the application status of the polling operation differs among the PDSCHs as described above, the base station may signal whether or not polling is to be performed on a specific PDSCH. The base station may announce whether the specific PDSCH is a polling target using a DCI such as the DL assignment according to method (1), (2), or (3) described above, or may configure whether the UE should perform the polling operation through a higher layer signal.

The tenth polling-based A/N feedback method may be applied in combination with other proposals of the present invention as long as they do not conflict with each other.

FIG. 16 is a flowchart illustrating a method for transmitting an uplink signal of a user equipment according to the present invention.

First, the UE receives downlink control information (DCI) for scheduling one or more downlink data from the base station and receives the one or more downlink data from the base station based on the DCI (S1610).

Subsequently, the US determines an uplink resource for transmitting an uplink signal (e.g., uplink control information) corresponding to the one or more downlink data received from the base station (S1620).

Herein, the UE may determine, as an uplink resource for transmission of an uplink signal corresponding to the one or more downlink data, one uplink candidate resource among a plurality of uplink candidate resources configured by higher layer signaling or system information based on the indication information included in the DCI and information about the DCI. For example, when an RRC (Remote Resource Control) connection with the base station is established, the UE may determine, as the uplink resource, one uplink candidate resource among a plurality of uplink candidate resources configured by higher layer signaling. Alternatively, if the RRC connection with the base station is not configured/established, the UE cannot receive higher layer signaling from the base station, and therefore may determine, as the uplink resource, one uplink candidate resource among a plurality of uplink candidate resources configured by the system information.

In the present invention, the system information may include a system information block (SIB) or remaining minimum system information (RMSI).

In a preferred example, the indication information may be composed of 2 bits similar to the ARI of the legacy LTE system.

Also, the plurality of uplink candidate resources may be composed of more than four uplink candidate resources. Therefore, it is difficult to indicate a specific uplink candidate resource among the uplink candidate resources exceeding four using only the 2-bit indication information alone. Therefore, the UE may determine a specific uplink candidate resource among the uplink candidate resources exceeding four as a resource for uplink signal transmission based on the 2-bit indication information and the information about the DCI.

For example, the plurality of uplink candidate resources may be composed of eight uplink candidate resources. Here, the eight uplink candidate resources may be divided into four uplink candidate resource groups each including two uplink candidate resources. In this case, the UE may determine one uplink candidate resource group among the four uplink candidate resource groups based on the 2-bit indication information, and determine one of the two uplink candidate resources in the uplink candidate resource group as a resource for uplink signal transmission based on the information about the DCI.

In the present invention, the information about the DCI may include one or more of (1) a starting control channel element (CCE) index in which the DCI is transmitted, (2) a downlink control region index in which the DCI is transmitted, (3) a starting physical resource block (PRB) index of the one or more downlink data indicated by the DCI, (4) hybrid automatic repeat request (HARQ) ACK timing indicated by the DCI, and (5) a bandwidth part (BWP) index indicated by the DCI.

Subsequently, the UE transmits uplink control information corresponding to the one or more downlink data through the uplink resource determined in step S1620 (S1630).

As described above, in the present invention, the base station may indicate/allocate, through the DCI scheduling one or more downlink data, an uplink resource for uplink signal transmission corresponding to the one or more downlink data.

Here, the size of the determined uplink resource may be configured differently according to the number of the one or more downlink data.

Specifically, an uplink resource for transmitting uplink control information corresponding to one downlink datum may be configured to be smaller than an uplink resource for transmitting uplink control information corresponding to a plurality of downlink data. In other words, the uplink resource may be configured to be larger to transmit uplink control information corresponding to a larger number of downlink data.

In addition, the uplink control information may include acknowledgment information for the one or more downlink data. For example, the uplink control information may include HARQ-ACK/NACK information for the one or more downlink data.

In the above description, the downlink data may correspond to a physical downlink shared channel (PDSCH), and the uplink resource may correspond to a physical uplink control channel (PUCCH).

In addition, the plurality of uplink candidate resources may be configured for each bandwidth part (BWP).

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

Figure 17:
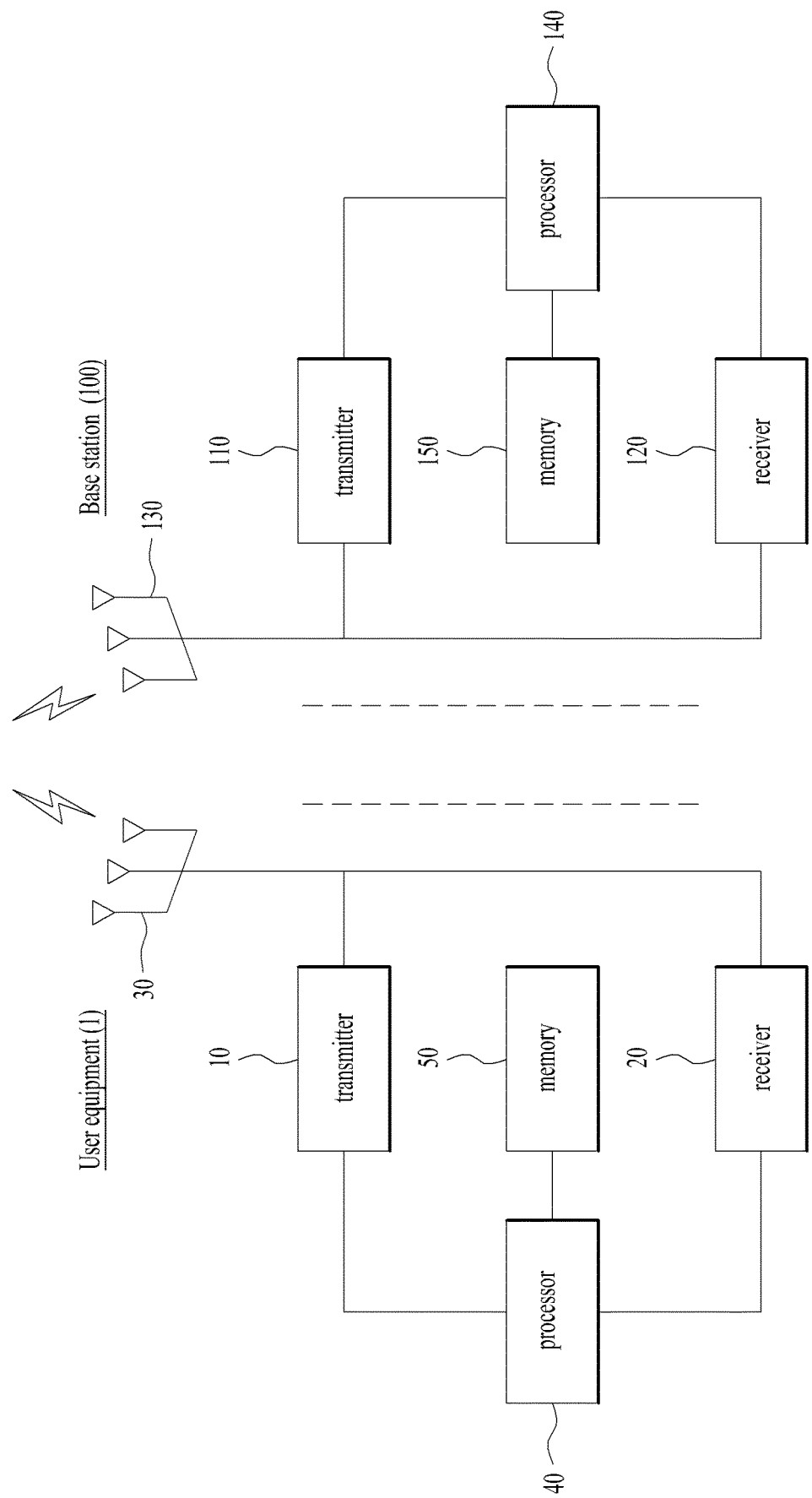
FIG. 17 is a diagram illustrating configurations of a UE and a base station capable of being implemented by the embodiments proposed in the present invention.

FIG. 17 is a diagram illustrating configurations of a UE and a base station capable of being implemented by the embodiments proposed in the present invention. The UE and the base station shown in FIG. 17 operate to implement the embodiments of the methods for uplink signal transmission/reception between the UE and the base station described above.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 configured as described above receives, through the receiver 20, downlink control information (DCI) for scheduling one or more downlink data, and receives the one or more downlink data based on the DCI. Then, the UE 1 determines, through the processor 40, an uplink resource for uplink signal transmission corresponding to the one or more downlink data. At this time, the UE 1 may determine one uplink candidate resource out of a plurality of uplink candidate resources configured by higher layer signaling or system information based on the indication information included in the DCI and the information about the DCI, as an uplink resource for uplink signal transmission corresponding to the one or more downlink data. Subsequently, the UE 1 transmits uplink control information corresponding to the one or more downlink data through the determined uplink resource using the transmitter 10.

The base station 100 transmits, to the UE 1, downlink control information (DCI) for scheduling one or more downlink data through the transmitter 110, and transmits the one or more downlink data based on the DCI. Then, the BS 100 receives uplink control information corresponding to the one or more downlink data through the receiver 120 in a specific uplink resource. Here, as described above, the specific uplink resource may be configured as one of a plurality of uplink candidate resources configured by higher layer signaling or system information based on the indication information included in the DCI and the information about the DCI.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 17 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting an uplink signal to a base station by a user equipment in a wireless communication system, the method comprising:

receiving, from the base station, downlink control information (DCI) for scheduling one or more downlink data;

receiving, from the base station, the one or more downlink data based on the DCI;

determining an uplink resource for uplink signal transmission corresponding to the one or more downlink data, wherein the uplink resource is determined, among a set of uplink candidate resources configured by higher layer signaling based on (i) indication information included in the DCI, and (ii) a control channel element (CCE) index in which the DCI is transmitted; and transmitting, to the base station through the determined uplink resource, uplink control information corresponding to the one or more downlink data.

2. The method according to claim 1, wherein the set of uplink candidate resources comprises at least one uplink candidate resource that exceeds a maximum number that the indication information is capable of separately indicating.

3. The method according to claim 2, wherein the set of uplink candidate resources is divided into a plurality of uplink candidate resource groups each comprising two or more first uplink candidate resources, respectively, wherein the indication information indicates one uplink candidate resource group among the plurality of uplink candidate resource groups, and wherein the uplink resource is determined based on information about the DCI among two or more uplink candidate resources included in the one uplink candidate resource group indicated by the indication information.

4. The method according to claim 1, wherein a size of the determined uplink resource is set differently according to a number of the one or more downlink data.

5. The method according to claim 1, wherein the uplink control information comprises acknowledgment information about the one or more downlink data.

6. The method according to claim 1, wherein the one or more downlink data corresponds to a physical downlink shared channel (PDSCH).

7. The method according to claim 1, wherein the determined uplink resource corresponds to a physical uplink control channel (PUCCH).

8. The method according to claim 1, wherein the set of uplink candidate resources is configured for each bandwidth part (BWP).

9. A method of receiving an uplink signal from a user equipment by a base station in a wireless communication system, the method comprising:

transmitting, to the user equipment, downlink control information (DCI) for scheduling one or more downlink data; and transmitting, to the user equipment, the one or more downlink data based on the DCI; and receiving, from the user equipment through an uplink resource, uplink control information corresponding to the one or more downlink data, wherein the uplink resource is configured as one among a set of uplink candidate resources configured by higher layer signaling based on (i) indication information included in the DCI, and (ii) a control channel element (CCE) index in which the DCI is transmitted.

10. A user equipment configured to transmit an uplink signal to a base station in a wireless communication system, the user equipment comprising:

a transmitter;
a receiver;
at least one processor; and
at least one computer memory operably connectable to the at least one processor and storing instructions that, when executed by the at least one processor, perform operations comprising:

receiving, from the base station, downlink control information (DCI) for scheduling one or more downlink data;

receiving, from the base station, the one or more downlink data based on the DCI;

determining an uplink resource for uplink signal transmission corresponding to the one or more downlink data, wherein the uplink resource is determined among a set of uplink candidate resources configured by higher layer signaling based on (i) indication information included in the DCI, and (ii) a control channel element (CCE) index in which the DCI is transmitted; and transmitting, to the base station through the determined uplink resource, uplink control information corresponding to the one or more downlink data.

11. A base station configured to receive an uplink signal from a user equipment in a wireless communication system, the base station comprising:

a transmitter;
a receiver;
at least one processor; and
at least one computer memory operably connectable to the at least one processor and storing instructions that, when executed by the at least one processor, perform operations comprising:

transmitting, to the user equipment, downlink control information (DCI) for scheduling one or more downlink data;

transmitting, to the user equipment the one or more downlink data based on the DCI; and receiving, from the user equipment through an uplink resource, uplink control information corresponding to the one or more downlink data, wherein the uplink resource is configured as one among a set of uplink candidate resources configured by higher layer signaling based on (i) indication information included in the DO, and (ii) a control channel element (CCE) index in which the DCI is transmitted.

12. The method according to claim 1, wherein the uplink resource is determined, among the set of uplink candidate resources configured by the higher layer signaling, based on:

(i) first uplink resource information comprising one of the indication information included in the DCI or the CCE index in which the DCI is transmitted, wherein the first uplink resource information relates to an uplink resource region among a plurality of uplink resource regions in the set of uplink candidate resources; and (ii) second uplink resource information comprising the other of the indication information included in the DCI or the CCE index in which the DCI is transmitted, wherein the second uplink resource information relates to the uplink resource within the uplink resource region indicated by the first uplink resource information.

* * * * *